(12) United States Patent
Tabata et al.

(10) Patent No.: US 6,513,970 B1
(45) Date of Patent: Feb. 4, 2003

(54) INFRARED THERMOMETER

(75) Inventors: Makoto Tabata, Kyoto-fu (JP); Tetsuya Sato, Kyoto-fu (JP); Hiroyuki Ota, Kyoto-fu (JP); Shigeru Tomioka, Kyoto-fu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 09/807,828

(22) PCT Filed: Oct. 20, 1999

(86) PCT No.: PCT/JP99/05774

§ 371 (c)(1),
(2), (4) Date: Apr. 19, 2001

(87) PCT Pub. No.: WO00/22978

PCT Pub. Date: Apr. 27, 2000

(30) Foreign Application Priority Data

Oct. 20, 1998 (JP) ............................... 10-298281
Oct. 28, 1998 (JP) ............................... 10-306716
Oct. 29, 1998 (JP) ............................... 10-307934

(51) Int. Cl.$^7$ ............................. G01J 5/00; G01K 3/04; A61B 6/00
(52) U.S. Cl. .................. 374/131; 600/474; 374/102; 374/121
(58) Field of Search .................. 374/158, 169, 374/163, 131, 107, 102–103, 121; 600/474

(56) References Cited

U.S. PATENT DOCUMENTS

| | | | | |
|---|---|---|---|---|
| 4,629,336 A | * | 12/1986 | Ishizaka | 374/169 |
| 4,648,055 A | * | 3/1987 | Ishizaka et al. | 364/557 |
| 4,866,621 A | * | 9/1989 | Ono | 364/413.03 |
| 4,895,164 A | | 1/1990 | Wood | |
| 5,015,102 A | * | 5/1991 | Yamaguchi | 374/107 |
| 5,179,936 A | | 1/1993 | O'Hara et al. | |
| 5,392,031 A | * | 2/1995 | Toriumi et al. | 340/588 |
| 6,270,252 B1 | * | 8/2001 | Siefert | 374/102 |
| 6,349,269 B1 | * | 2/2002 | Wallace, Jr. | 702/132 |
| 6,367,973 B2 | * | 4/2002 | Yamaka | 374/158 |
| 2002/0035332 A1 | * | 3/2002 | Chen et al. | 600/490 |

FOREIGN PATENT DOCUMENTS

| | | | | | |
|---|---|---|---|---|---|
| JP | 60157031 A | * | 8/1985 | | 374/163 |
| JP | 60187830 A | * | 9/1985 | | 374/163 |
| JP | 2-35322 | | 2/1990 | | |
| JP | 5-28617 | | 4/1993 | | |
| JP | 8-191800 | | 7/1996 | | |
| JP | 8-215155 | | 8/1996 | | |
| WO | 90/02521 | | 3/1990 | | |
| WO | 97/24588 | | 7/1997 | | |

* cited by examiner

*Primary Examiner*—Diego Gutierrez
*Assistant Examiner*—Gail Verbitsky
(74) *Attorney, Agent, or Firm*—Morrison & Foerster LLP

(57) ABSTRACT

An infrared sensor 20 is held in a housing 10 by a sensor holder 28 made of synthetic resin. A waveguide 30 for guiding infrared radiation, which is emitted from a target, to the infrared sensor 20 is supported by waveguide holders 31, 32 made of synthetic resin (or metal). An air layer (insulative layer, gap) 34 resides between an inner end (terminal end) 30b of the waveguide 30 and the infrared sensor 20. A probe 40 made of synthetic resin surrounding an externally protruding portion of the waveguide 30 is provided. An air layer (insulating layer, gap) 33 resides between the tip of the probe 40 and a tip (outer end) 30a of the waveguide 30. The tip of the waveguide 30 is covered by a cap 50.

2 Claims, 20 Drawing Sheets

INFRARED THERMOMETER

TECHNICAL FIELD

This invention relates to an infrared thermometer for measuring the temperature of a target by sensing infrared radiation emitted from the target.

BACKGROUND ART

One application of an infrared thermometer is to use it as an infrared clinical thermometer for measuring the temperature (body temperature) of the human body. This thermometer generally performs temperature measurement based upon infrared radiation emitted from the external ear canal or tympanic membrane, etc., of the human ear.

An infrared clinical thermometer is equipped with a probe insertable into the ear orifice, and the probe is provided within the clinical thermometer body (housing) so as to protrude to the outside. Provided within the probe is a waveguide for guiding infrared radiation, which is emitted from the tympanic membrane or the like (biological surface tissue), to an infrared sensor disposed inside the housing.

One important problem with an infrared clinical thermometer is that when the probe is inserted into the ear orifice, heat is transferred from the ear orifice (human body) to the infrared sensor via the probe and waveguide, as a result of which the output of the infrared sensor becomes unstable. The adverse influence of heat from the surrounding environment transferred from the housing to the infrared sensor also cannot be ignored.

One technique which solves this problem is as described in the specification of Japanese Patent Publication No. 5-28617 (or U.S. Pat. No. 4,895,164 or WO 90/02521). According to the infrared clinical thermometer disclosed in these references, the larger portion of the waveguide and the infrared sensor are embedded in a comparatively large heat conducting block (isothermic block means) made of metal (an excellent thermal conductor such as aluminum or copper). The heat conducting block (the infrared sensor portion) is supported inside the housing by a spacer stand, and a space between the heat conducting block and housing acts as an insulative air layer to reduce the migration of heat from the heat source outside the housing to the heat conducting block. It is stated that the waveguide and infrared sensor are held in an isothermic state at ambient temperature by the heat conducting block. Furthermore, a low-emissivity barrier such as an aluminum tube is placed around the outer end of the waveguide, and the barrier is covered by a cover of low thermal conductivity.

One feature of an infrared clinical thermometer is short measurement time (e.g., 1 to 5 seconds). Since the heat conducting block in the foregoing references is comparatively large, a state of thermal equilibrium (temperature equalization) is not attained in such a short period of time. As long as heat from the human body travels to the heat conducting block by being transmitted along the waveguide, the temperature of the infrared sensor also will vary. Thus the instability of the output from the infrared sensor is a problem that has not been solved satisfactorily.

A technique intended to solve this problem is illustrated in the specification of International Patent Laid-Open No. WO 97/24588. According to the infrared thermometer described in this reference, a heat conductive tubular body is provided between a probe and a waveguide in a state thermally insulated therefrom, and heat from the probe is prevented from being transmitted to the waveguide and infrared sensor. The provision of the heat conductive tubular body increases the number of component parts.

Another problem with infrared thermometers is that dust or the like penetrates the interior of the waveguide, resulting in reduced measurement precision.

In order to solve this problem, the conventional practice is to bond silicon glass to the opening at the tip of the waveguide to close the same. However, problems encountered with silicon glass are difficulty in working the glass and the high price thereof. In addition, fabrication cost rises owing to the use of a bonding agent.

A method available is to close the opening at the tip of the waveguide by covering it with a resin film and secure the resin film to the waveguide by a ring member. The problems with this method are the labor required for assembly and the fact that the resin film tears easily when contaminants are wiped off.

An infrared clinical thermometer has a temperature range (measurable temperature range) (e.g., 10~40°0 C.) within which it is capable of operating normally. An error is displayed if an attempt is made to use an infrared clinical thermometer in an environment where the temperature is outside this temperature range. A further problem is inconvenience in that the user cannot determine why an error display is being presented nor how long it will take before the thermometer can be used.

DISCLOSURE OF THE INVENTION

An object of the present invention is to make it possible to measure temperature accurately, with simple structure, by reducing, to the maximum degree, the influence exerted upon an infrared sensor by heat transferred from the outside (a target such as the ear canal) to a waveguide.

Another object of the present invention to provide a structure that is capable of alleviating the adverse effects of environmental temperature.

A further object of the present invention is to effectively prevent dust or the like from penetrating the interior of a waveguide in an infrared thermometer and to implement this in such a manner that assembly is facilitated.

Still another object of the present invention is to so arrange it that the length of time needed before measurement becomes possible is shown clearly when an infrared thermometer in a temperature environment in which measurement is impossible is placed in a temperature environment in which measurement is possible.

The present invention provides an infrared thermometer having an infrared sensor placed inside a housing and a waveguide for guiding infrared radiation, which is emitted from a target, to the infrared sensor, characterized in that the infrared sensor and waveguide are held in direct or indirect contact with the housing in a state in which the infrared sensor is thermally insulated from the waveguide.

There are various modes available for supporting the infrared sensor in a state in which it is thermally insulated from the waveguide. The waveguide has an outer end that opposes the target and an inner end that opposes the infrared incidence surface (sensor surface) of the infrared sensor. In one of the above-mentioned modes, the inner end of the waveguide is spaced apart (by provision of a gap) from the infrared incidence surface of the infrared sensor. An air layer is present between the inner end of the waveguide and the infrared sensor, and the air layer has a heat insulative effect.

The waveguide and infrared sensor can be held in the housing by a common heat insulating member or by separate heat insulating members. Synthetic resin is a typical example of the heat insulating member (a member of low thermal conductivity). It may be so arranged that the waveguide is supported by a metal member (a member having excellent thermal conductivity).

In another mode of supporting the infrared sensor in a state in which it is thermally insulated from the waveguide, the infrared sensor is placed inside the inner end of the waveguide and the infrared sensor is held spaced away from an inner wall of the waveguide. In this case also an insulative air layer is provided between the waveguide and infrared sensor.

The infrared sensor and the waveguide can be held in the housing by a common heat insulating member or by separate heat insulating members. The infrared sensor may be supported by providing a heat insulator between the infrared sensor and waveguide.

In yet another mode, the infrared sensor can be supported on the inner end of the waveguide by a heat insulating (low thermal conductivity) connecting member. The infrared incidence surface of the infrared sensor opposes the inner end of the waveguide. The waveguide is supported on the housing by a heat insulating member or metal.

Further, such a mode is covered by the present invention in which the infrared sensor is held in a state in which it is thermally insulated from the waveguide that the inner end of the waveguide is in contact with the infrared incidence surface of the infrared sensor. Preferably, the inner end of the waveguide is formed to have notches to reduce the area of surface contact with the infrared sensor.

Thus, in accordance with the present invention, the infrared sensor is held in a state in which it is thermally insulated from the waveguide (a state in which there is low thermal transfer). Even if heat is transferred from the target to the waveguide, therefore, the transfer of heat from the waveguide to the infrared sensor is suppressed. As a result, the infrared sensor is held in a thermally stable state.

The present invention is characterized in that the infrared sensor is thermally insulated (spaced away) from the waveguide; the infrared sensor and waveguide are not rendered isothermic. In other words, the present invention is devoid of means corresponding to the heat conducting block or isothermic block means of the kind in the prior art. Furthermore, there is no heat conductive tubular body provided between the probe and the waveguide in a state thermally insulated therefrom. The result is a simple structure for the infrared thermometer.

Holding the infrared sensor by the heat insulating member makes it possible to minimize the effects of heat transferred from the outside via the housing and other members.

In a preferred embodiment, a probe, which is formed by a heat insulating member surrounding a part of the waveguide protruding externally of the housing, is attached to the housing, and a gap is provided at least between the outer end of the waveguide and the probe. Even if the probe contacts the target, the transfer of heat from the target to the waveguide is suppressed because the waveguide is spaced away from the probe within the probe (because of the presence of an insulative air layer).

The present invention further provides a cap which covers the waveguide of the infrared thermometer.

The cap has an infrared-transparent upper bottom for closing an opening in the outer end of a waveguide, and a circumferential wall portion contiguous to the upper bottom and in intimate contact with the periphery of the waveguide, the upper bottom and circumferential wall portion being formed as an integral body. In a preferred embodiment, the cap is made of synthetic resin.

Because the cap (the waveguide cap) according to the present invention is obtained by integrally forming the infrared-transparent upper bottom and circumferential wall portion, the waveguide need merely be covered by the cap, thereby providing ease of operability and ease of assembly superior to prior art. The cap prevents dust from penetrating the interior of the waveguide.

In an embodiment, the waveguide cap has an outwardly or inwardly directed flange provided on the circumferential wall portion. The flange acts to retain the waveguide cap. The waveguide preferably is provided with a portion for engaging with the flange. This enhances the retention effect greatly.

The present invention further provides an infrared thermometer capable of clearly indicating length of time until measurement is possible when the infrared thermometer located in a temperature environment in which measurement is impossible is placed in a temperature environment in which measurement is possible.

The infrared thermometer includes: infrared measurement means for measuring temperature of a target based upon an output of an infrared sensor; temperature measurement means for measuring temperature within the infrared thermometer; means for determining whether the temperature measured by the temperature measurement means lies within a measurable temperature range of the infrared measurement means; means for estimating waiting time that would be needed for the temperature measured by the temperature measurement means to fall within the measurable temperature range when the determination means has determined that the measured temperature does not lie within the measurable temperature range; and means for giving notification of the waiting time that has been estimated by the estimation means.

In a preferred embodiment, the estimation means senses a change in temperature at least at two different times and estimates the waiting time based upon this temperature change, current temperature and target (reference) temperature within the measurable temperature range.

Since the waiting time is reported (displayed), the user can ascertain how much time must pass before the infrared thermometer can be used.

BRIEF DESCRIPTION OF THE DRAWINGS

FIGS. 4 and 5 illustrate the waveguide cap in enlarged form, in which FIG. 4 is a sectional view and FIG. 5 a plan view;

FIGS. 18 to 20 illustrate another embodiment, in which FIG. 18 is a sectional view of an infrared sensor, FIG. 19 a block diagram illustrating the electronic circuitry of the infrared clinical thermometer, and FIG. 20 a flowchart illustrating the procedure of processing executed by a CPU.

BEST MODE FOR CARRYING OUT THE INVENTION

Figure 1:
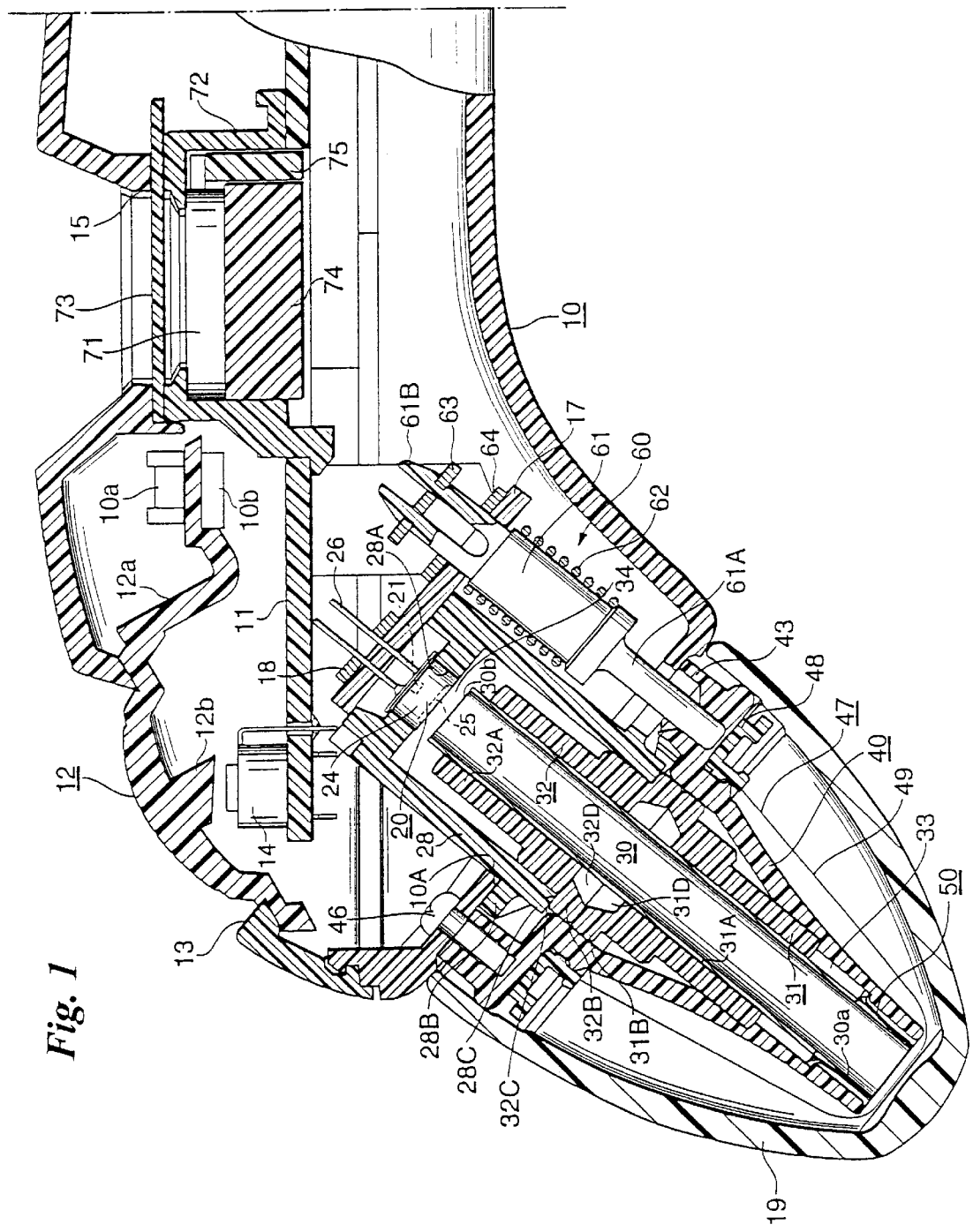
FIGS. 1 and 2 are side views, partially cut away, illustrating respective halves of the overall structure of an infrared clinical thermometer.
Figure 2:
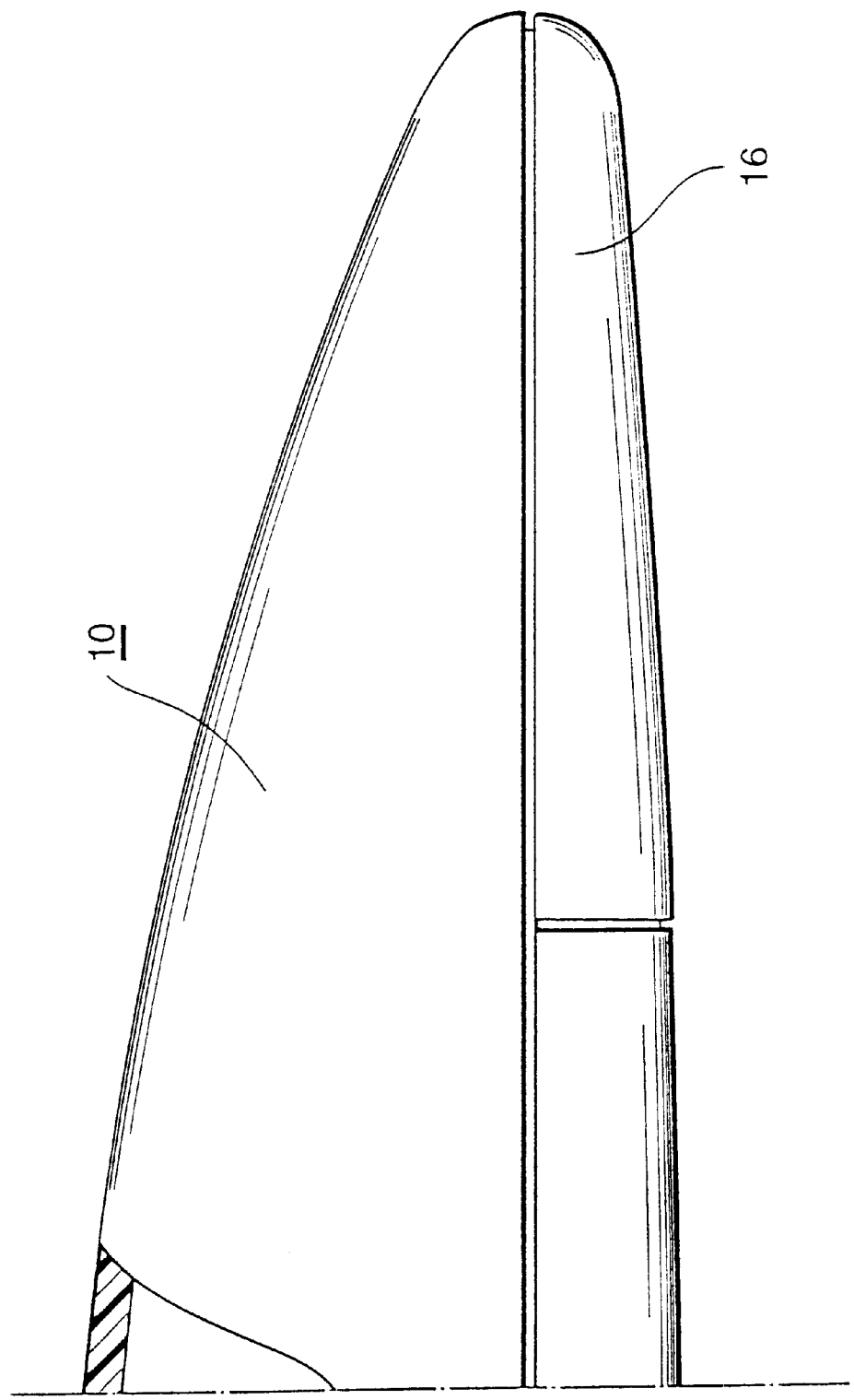

FIGS. 1 and 2 illustrate the entirety of an infrared clinical thermometer in considerable enlargement.

The infrared clinical thermometer has a housing 10 the overall shape of which is that of an approximately circular or oblate cylinder for easy handling. The tip end (the portion, shown on the left side in FIG. 1, in which an infrared sensor, described later, is placed) is slightly curved, the housing being larger nearer the tip end (the front end) and slender nearer the terminal end (rear end) (shown on the right side in FIG. 2). The housing 10 is made of a synthetic resin (e.g., ABS: acrylonitrile-butadiene-styrene plastic).

Disposed within the housing 10 is a printed circuit board 11 on which a temperature measurement circuit (inclusive of a microprocessor), a display control circuit and other electronic circuits are assembled.

The upper face (or front side) of the housing 10 at the tip thereof is formed to have a hole 13 confronted from its inner side by a switch operating button 12. The button 12 has an outwardly protruding curved surface. An attaching piece 12a extends from the button 12 and has an end that is fixed by being embraced between two projections 10a and 10b provided on the inner surface of the housing 10. The button 12 is molded in resin (e.g., ABS resin) as an integral part of the attaching piece 12a. The latter possesses elasticity.

The inner surface of the button 12 is provided with an operating projection 12b. If the button 12 is pushed into the housing 10 from the outside, the operating projection 12b strikes an actuator of a switch 14 provided on the board 11. Pressing the button once introduces power to the above-mentioned temperature measurement circuit and pressing it a second time starts measurement of body temperature.

The upper face (front side) of the housing 10 at the approximate central portion thereof is formed to have a hole 15. A liquid crystal display (LCD) device 71 is placed on the board 11 at a position corresponding to the hole 15. More specifically, the LCD device 71 is accommodated together with a lower spacer 74 in an LCD case 72, and the case 72 is secured to the board 11. The LCD device 71 is connected to a wiring pattern on the board 11 by a rubber connector 75. An LCD cover 73 consisting of transparent resin is provided on the LCD case 72. The LCD device 71 displays the measured body temperature and other information, and the user can see this information through the LCD cover 73 by way of the hole 15 in the housing 10.

A battery port is provided in the lower face (back side) of the housing 10 at the terminal end thereof. A battery cover 16 is removably attached to the housing by being screwed into the battery port.

An infrared sensor 20, waveguide 30, probe 40 and waveguide cap 50 are provided in the tip of the housing 10. The waveguide 30, probe 40 and waveguide cap 50 in particular are shown in enlarged form in FIG. 3.

The infrared sensor 20 includes a metal case 24 in the interior of which an infrared sensing element 21 is provided. The front side of the case 24 has a window and infrared-transparent silicon glass 25 is provided so as to close the window (see FIG. 18 for more details).

The waveguide 30 is cylindrical and made of a metal such as copper and both ends 30a, 30b of the waveguide are open. The open end 30a remote from the infrared sensor 20 shall be referred to as the outer end (or distal end), and the open end 30b close to the infrared sensor 20 shall be referred to as the inner end (or terminal end).

The probe 40, which is made of synthetic resin, has a gently curving conical shape the tip of which has been cut away, and the base end of the probe is formed to have a mounting flange 43. The flange 43 is formed to have screw holes 45. The tip of the probe 40 is formed to have two step portions 41, 42 on its inner surface, and a small annular protrusion 44 for fixing a probe cover 47 is formed in the vicinity of the base end of the probe.

The infrared sensor 20 is held in a sensor holder 28. More specifically, the sensor holder 28, which is made of synthetic resin (e.g., ABS resin), has the shape of a bottomed cylinder the bottom which is provided with a hole 28A. The infrared sensor 20 is fitted snugly inside the hole 28A. A board 17 is secured to the holder 28. The infrared sensor 20 has leads 26 connected to a wiring pattern on the board 17. A flange 28B is formed as an integral part of the sensor holder 28 on the outer circumferential surface thereof in the vicinity of an open end 28C. If necessary, a temperature sensing element (see numeral 22 in FIG. 18) is provided inside the infrared sensor 20 or a temperature sensor is provided in the proximity of the infrared sensor 20.

The waveguide 30 is held by two waveguide holders 31, 32. The waveguide holders 31, 32 also are made of synthetic resin (e.g., ABS resin) and are approximately cylindrical. The holes in the holders 31, 32 have a uniform diameter (with the exception of recesses 31D, 32D) and receive the waveguide 30 inserted snugly therein. The outer circumferential surfaces of the holders 31, 32 are such that the outer diameter differs in three stages. Portions 31A, 32A of smallest outer diameter are longest and portions 31B, 32B of largest outer diameter protrude in flange-like fashion. The recesses 31D, 32D are formed in the inner circumferential surfaces of the portions 31B, 32B.

The waveguide 30 is fitted into the hole of holder 31. When this is done the outer circumferential surface of the waveguide 30 and the inner circumferential surface of the hole in holder 31 are secured to each other by a bonding agent. Superfluous bonding agent is forced into the recess 31D. This is followed by inserting the waveguide 30 into the hole of holder 32. The holders 31 and 32 abut against each other at their large-diameter portions 31B, 32B.

The waveguide holder 32 is inserted into the sensor holder 28. The distal end 28C of sensor holder 28 abuts against a step 32C formed by the large-diameter portion 32B. The sensor holder 28 is inserted into a hole 10A formed in the tip of the housing 10, and the flange 28B of the sensor holder contacts the outer circumferential surface of the hole 10A. The distal ends of the waveguide holder 31 and waveguide 30 are inserted into the probe 40 and the small-diameter portion 31A of the holder 31 abuts against the step 42 on the inner surface of the probe 40. The flange 43 of the probe 40 is secured to the housing 10 by screws 46. As a result, the probe 40, waveguide holders 31, 32 (and therefore the waveguide 30) and sensor holder 28 (and therefore the infrared sensor 20) are secured snugly in the tip of the housing 10.

The infrared sensor 20 and approximately half the waveguide 30 are situated inside the housing 10, and the probe 40 and approximately half the waveguide 30 are protrude externally of the housing 10.

The outer end (distal end) 30a of the waveguide 30 is situated at approximately the same position as that of the tip of probe 40 or at a position somewhat inward from the tip of probe 40. A gap (air layer) 33 exists between the distal end of the waveguide 30 and the probe 40, there being no contact between the outer end 30a of waveguide 30 and the probe 40.

Further, the inner end (terminal end) 30b of waveguide 30 opposes the sensor face (the infrared incidence window, i.e., the silicon glass 25) of the infrared sensor 20. The inner end 30b of waveguide 30 and the infrared sensor 20 are not in contact, a gap (air layer) 34 residing between them. It goes without saying that the central axis of waveguide 30 and the central axis of infrared sensor 20 coincide.

When body temperature is measured by this infrared clinical thermometer, the tip of the probe 40 is inserted into the ear orifice (the external ear canal).

The probe 40 inevitably comes into contact with the ear orifice. Since body temperature generally will be higher than the temperature of the probe 40, heat will travel to the probe 40.

The probe 40, waveguide holders 31, 32 and sensor holder 28 are made of synthetic resin. Since synthetic resin has a much lower thermal conductivity than metal (i.e., constitutes a member of low thermal conductivity), it may be referred to as a heat insulating member (in this specification, the terms "low-conductivity member" and "heat insulating member" are synonymous). The gap (air layer 33) is present between the inner surface of probe 40 at the tip thereof and the outer end 30a of waveguide 30, and the air layer 33 also possesses a heat insulative effect. As a result, the structure is such that heat transferred to the tip of probe 40 is not readily transferred to the waveguide 30. Heat is not readily transferred from the tip of probe 40 to the waveguide 30 via the holders 31, 32, and heat is not readily transferred to the infrared sensor 20 via the sensor holder 28.

Even if a small amount of heat from the ear orifice is transmitted to the outer end 30a of waveguide 30, the gap (air layer) 34 is present between the inner end 30b of waveguide 30 and the infrared sensor 20, whereby the two are thermally insulated from each other. Accordingly, almost no heat is tranferred to the infrared sensor 20.

Thus, when body temperature is measured, almost no body heat is transferred to the infrared sensor 20 and the infrared sensor 20 receives almost no adverse influence from the heat given off by the target. Since the infrared sensor 20 is held by the sensor holder 28 made of synthetic resin (a heat insulating member), the sensor is almost entirely unaffected by heat from the surrounding environment.

Infrared radiation that emanates from the ear orifice (tympanic membrane) is introduced to the infrared sensor 20 through the interior of the waveguide so that a correct temperature measurement is carried out. If necessary, the measured temperature is corrected based upon an output from the temperature sensor (temperature sensing element). The final measured temperature is displayed on the LCD device 71.

The sensor holders 31, 32 may be made of a metal such as aluminum. In such case the sensor holder is not split into the two members indicated by numerals 31, 32 but may be obtained by integrating the two portions 31, 32. The recesses 31D, 32D are unnecessary. Heat that has travelled from the ear orifice or the like to the waveguide 30 is absorbed by the metallic sensor holder and therefore almost no heat is transferred to the infrared sensor 20.

The probe cover 47 is constituted by a ring 48 made of synthetic resin, and a bag or sheath 49, which consists of vinyl or other thin synthetic resin sheet, attached to the ring 48. The probe cover 47, which is for preventing the transmission of disease, is exchanged for a new cover on a per-user basis. In other words, the probe cover is disposable. The ring 48 is fitted over the annular protrusion 44 provided on the base of the probe 40, whereby the probe cover 47 is attached to the probe 40.

A switch 60 is provided for sensing that the probe cover 47 has been attached. The switch 60 includes a movable shaft 61, and the shaft 61 has two ends 61A and 61B. The end 61A is slender and passes slidably through a hole 45A (which penetrates the screw hole 45) formed in the flange 43 of probe 40. The end 61B passes slidably through a hole provided in the board 17 and has a contact 63 attached to its distal end. The shaft 61 is urged outwardly at all times by a spring 62 so that the end 61A projects outwardly from the flange 43 at the base of probe 40. The contact 63 is in contact with a wiring pattern 64 on the board 17 (turning on the switch).

If the probe cover 47 is placed on the probe 40, the protruding end 61A of shaft 60 is pushed against the force of spring 62 by the ring 48. As a result, the contact 63 parts from the wiring pattern 64 (turning off the switch), whereby the fact that the probe cover 47 has been attached is sensed. Sensing of the attaching of probe cover 47 may be adopted as a condition to start measurement of body temperature, and an arrangement may be adopted in which this event is indicated by an indicator or by the LCD device 71.

A front cap 19, which covers the probe 40, is removably attached to the annular protrusion of the flange 43 on the base of probe 40. The front cap 19 also is made of synthetic resin and is placed on the probe 40 when this infrared clinical thermometer is not used.

Figure 4:
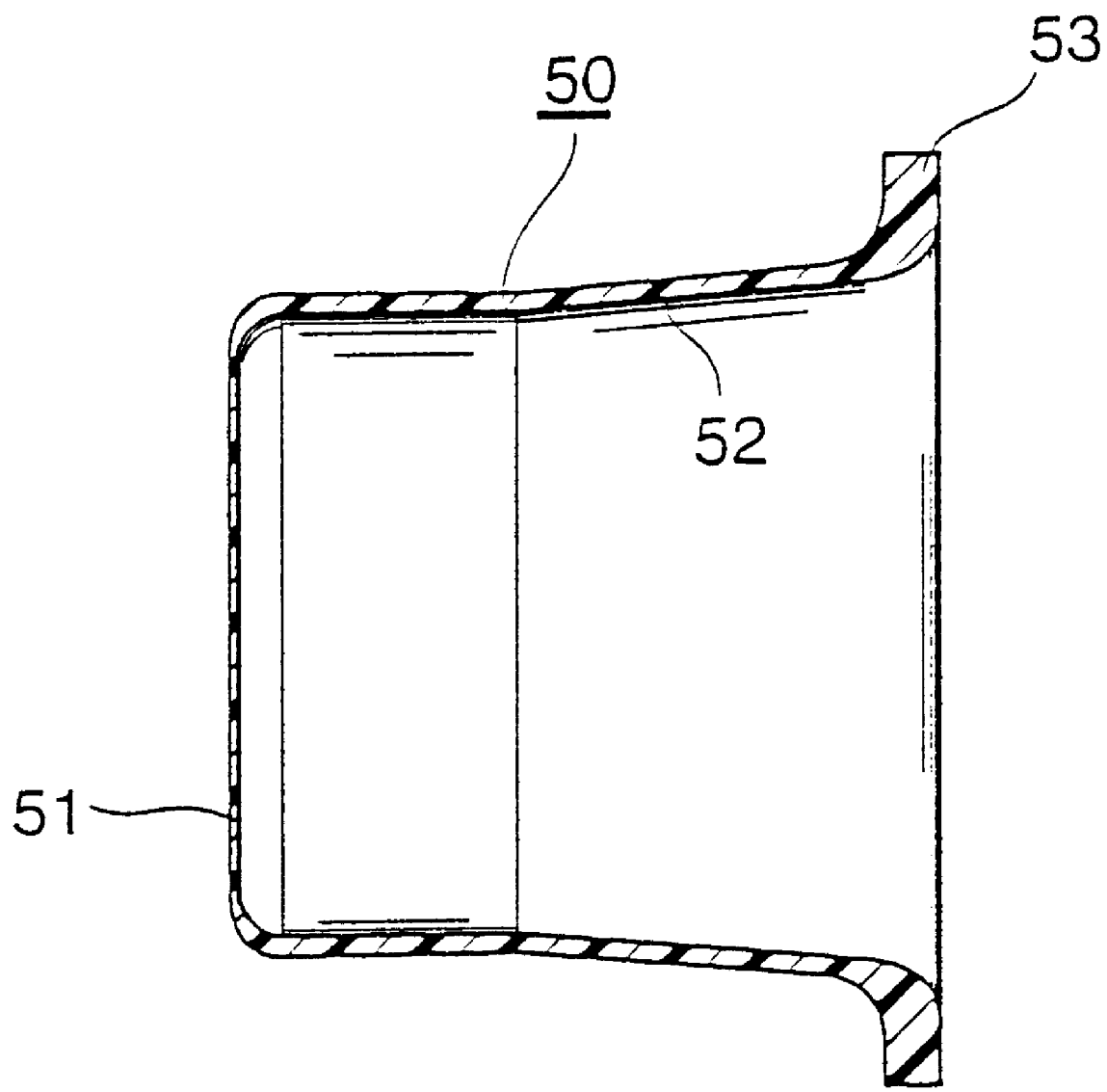
Figure 5:
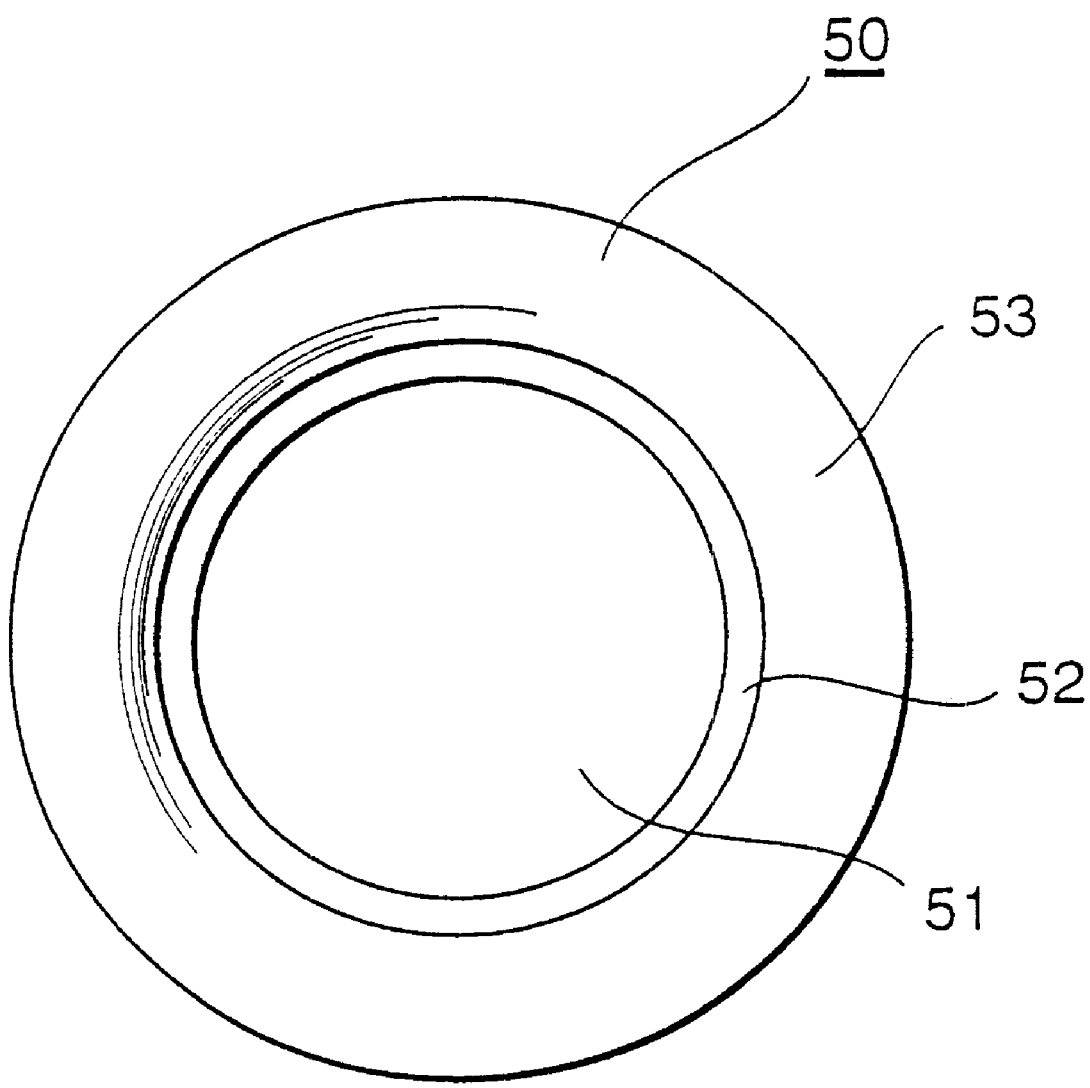

The details of the waveguide cap (cover) 50 are shown in FIGS. 4 and 5. The waveguide cap 50 is obtained by integrally forming, from a synthetic resin such as polyethylene, polypropylene, an upper bottom 51 through which infrared radiation is allowed to pass, a circumferential wall portion 52 contiguous to the periphery of the upper bottom 51, and a flange 53 protruding outwardly from the distal and of the circumferential wall portion 52. The diameter of the circumferential wall portion 52 increases in small increments as the flange 53 is approached. The thickness of the upper bottom 51 is cn the order of 10 to 60 $\mu$m, and the thickness of the circumferential wall portion 52 and flange 53 is on the order of 200 to 400 $\mu$m.

Figure 3:
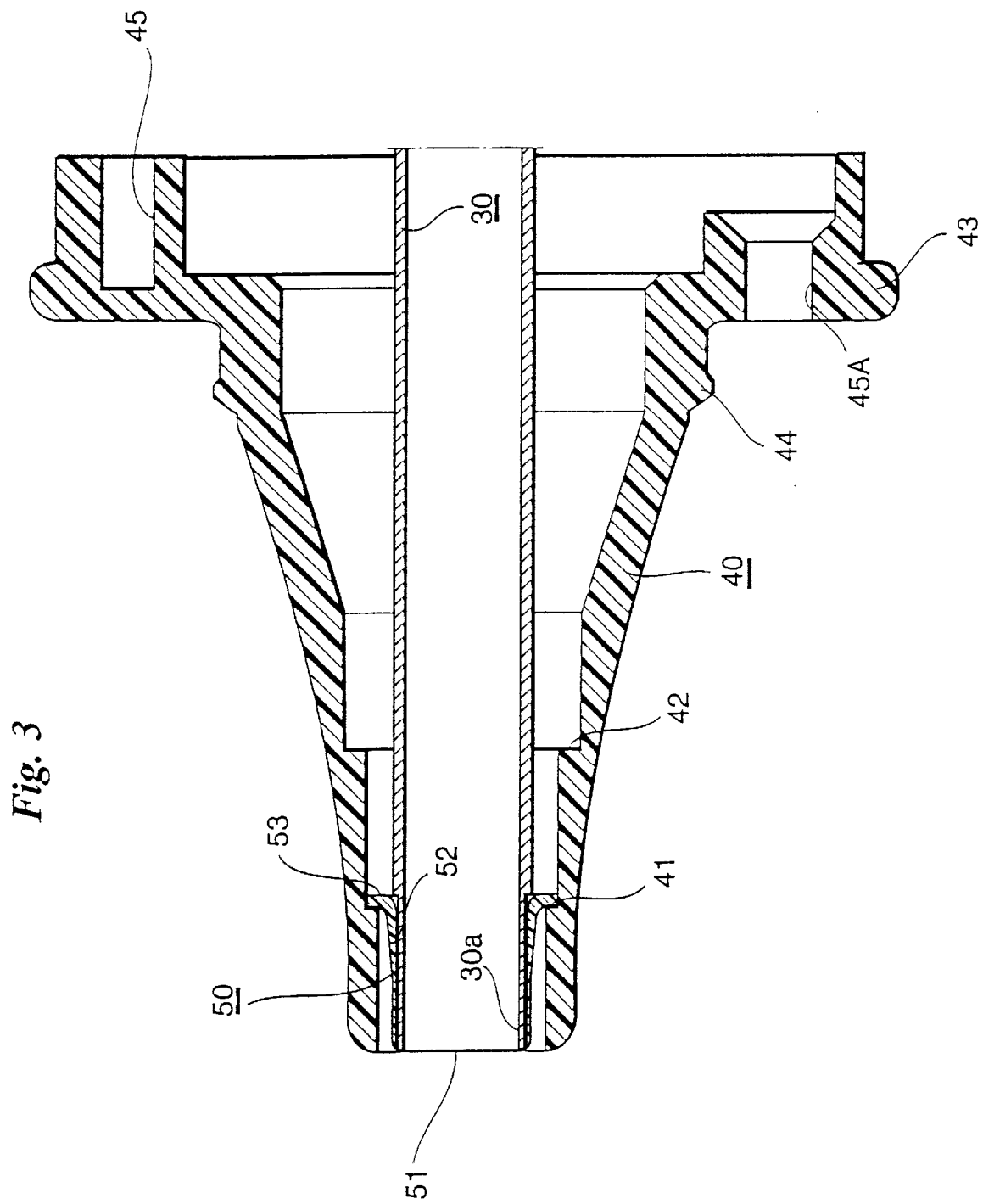
FIG. 3 is a sectional view illustrating, in enlarged form, a probe, waveguide and waveguide cap shown in FIG. 1.

With reference to FIG. 3, the outer end 30a of waveguide 30 has its outer circumferential surface cut away slightly to reduce the wall thickness. The length of the portion of reduced wall thickness is approximately equal to the depth of the cap 50. The reduced-thickness portion of the outer end 30a of waveguide 30 is covered by the cap 50. As a result, dust or the like is prevented from penetrating the interior of the waveguide 30 as when the probe cover 47 is replaced.

The inner diameter of the smallest diameter portion of the circumferential wall portion 52 of waveguide cap 50 should be equal to or somewhat smaller than the outer diameter of the outer end 30a of waveguide 30. As a result, the cap 50 is in intimate contact with the outer circumferential surface of the outer end 30a of waveguide 30.

The waveguide cap 50 is placed on the waveguide 30 before the waveguide 30 is inserted into the probe 40 together with the holder 31. When the waveguide 30 is inserted into the probe 40, the flange 53 of the cap 50 abuts against the step 41 on the inner surface of the probe 40. This prevents the cap 50 from falling off.

The cap 50 that has been placed on the waveguide 30 contacts the probe 40 at the flange 53. However, since the cap 50 also is made of synthetic resin, migration of heat from the probe 40 to the waveguide 30 is slight.

An arrangement may be adopted in which, rather than providing the probe 40 with the step portion (retaining protrusion) 41, the flange 53 of the cap 50 is made to contact the inner surface of the probe 40 with appropriate force, and it may be arranged so that the inner surface of the probe 40 is formed to have an annular groove and so that the flange 53 of cap 50 is fitted into this annular groove. An arrangement may also be adopted in which the end of the circumferential wall portion 52 is provided on its inner circumferential surface with an inwardly projecting annular protrusion, and the outer circumferential surface of the outer end 30a of waveguide 30 is formed to have an annular groove in which the above-mentioned annular protrusion is fitted. Of course, the flange 53 need not be provided and the probe 40 need not be formed to have the step (retaining protrusion) 41. The circumferential wall portion 52 may be formed to have the same diameter at all points. The cross section of the circumferential wall portion 52, rather than being circular, may be polygonal, such as hexagonal or octagonal. In such case the diameter of a circle internally tangent to the circumferential wall portion of the polygonal cylinder would be made approximately equal to or slightly smaller than the outer diameter of the outer end 30a of waveguide 30.

Thus, the waveguide cap 50 is obtained by integrally molding the infrared-transparent upper bottom 51 and circumferential wall portion 52. As a result, the cap 50 need merely be placed on the waveguide and therefore ease of assembly is improved over the prior art, which relies upon by the bonding of silicon glass or the fixing of a resin film by means of a ring member. If the cap 50 is furnished with sufficient strength, it will not readily be torn by wiping off contaminants from the infrared-transparent upper bottom.

Figure 6:
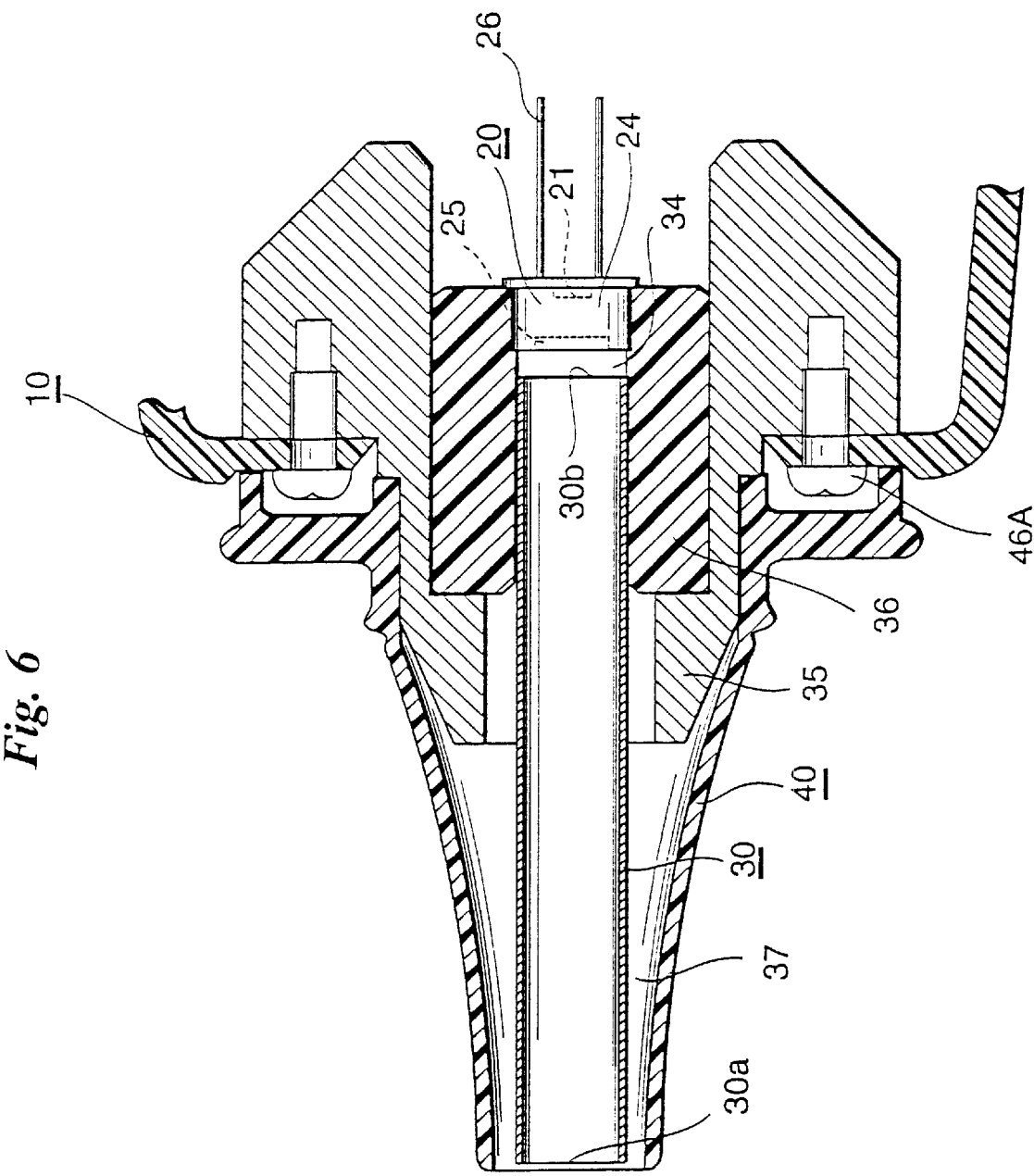
FIGS. 6 to 9, each of which illustrates a modification, are partially enlarged sectional views of the infrared thermometer.

FIG. 6 illustrates a modification. Here the structures of each of the members are illustrated in somewhat simplified form, and the waveguide cap, probe cover and front cap, etc., are not shown. Components identical to those shown in FIGS. 1 to 5 are designated by like reference characters and need not be described again. This applies to all of the modifications set forth below.

The inner end 30b of the waveguide 30 is supported by being inserted into a hole in a waveguide holder 36 made of synthetic resin. The infrared sensor 20 also is held by being fitted into the hole inside the holder 36. Furthermore, the holder 36 is supported by being inserted into a hole in a support block 35 made of a metal such as aluminum. The support block 35 is attached to the housing 10 by screws 46A. The probe 40 is attached to the support block 35.

The inner end 30b of the waveguide 30 and the infrared sensor 20 are not in contact with each other (owing to the presence of the insulative air layer 34). Since the waveguide 30 and the infrared sensor 20 are supported by the synthetic resin holder 36, which has a low thermal conductivity, these are supported in a state in which they are thermally insulated from each other. The outer end 30a of the waveguide 30 is not in contact with the probe 40. An air layer 37 exists between these components. That is, the air layer 37 and holder 36 are present between the waveguide 30 and the probe 40, so the waveguide 30 can be said to have been placed in a thermally insulated state.

Figure 7:
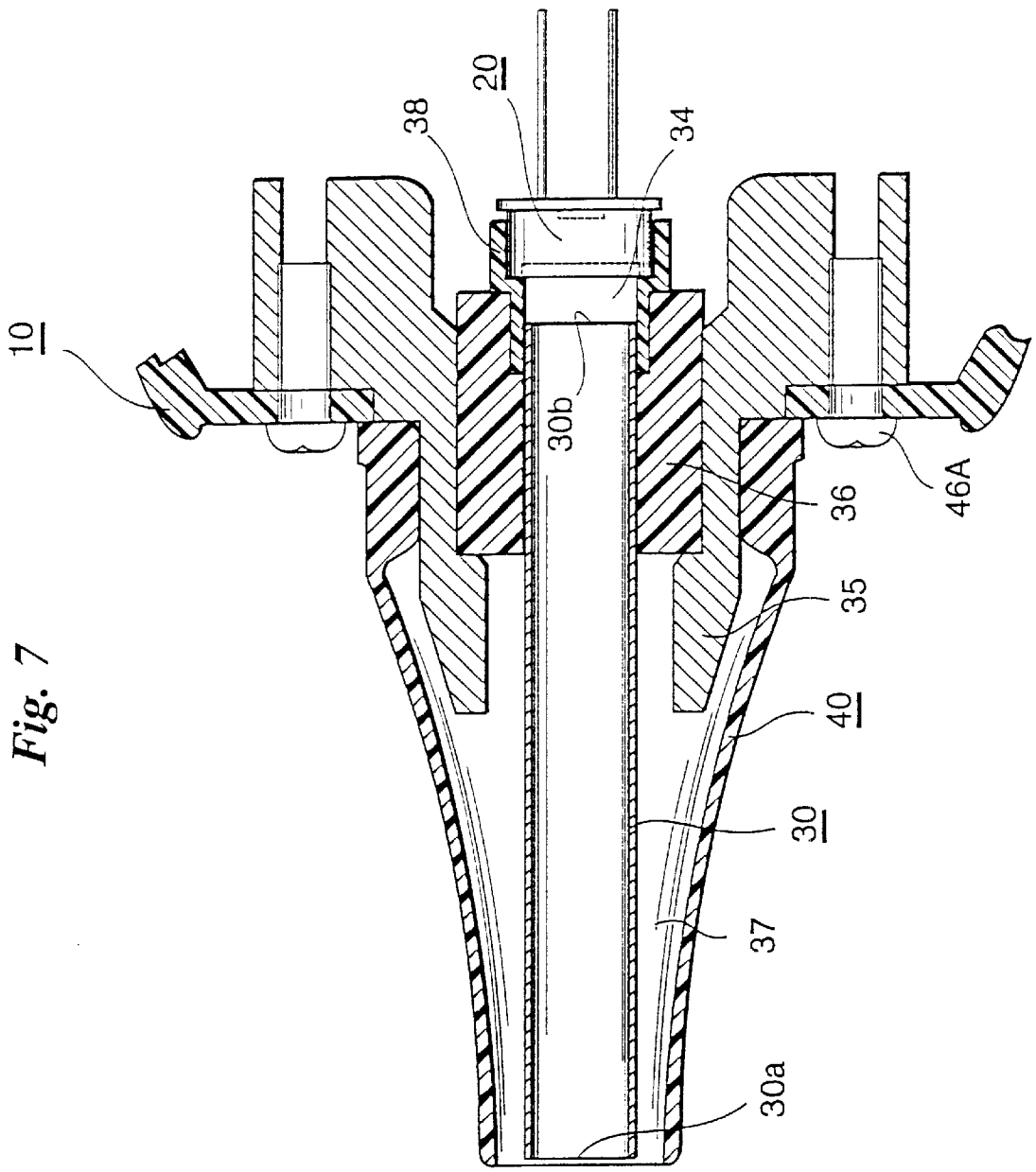

In FIG. 7, a connecting member 38 having two cylindrical portions of different diameters is attached to the waveguide holder 36, and the infrared sensor 20 is held in the large-diameter portion of the connecting member 38. The inner end 30b of the waveguide 30 and the infrared sensor 20 are separated from each other (the insulative air layer 34 resides between them), so that the infrared sensor 20 is thermally insulated from the waveguide 30.

Figure 8:
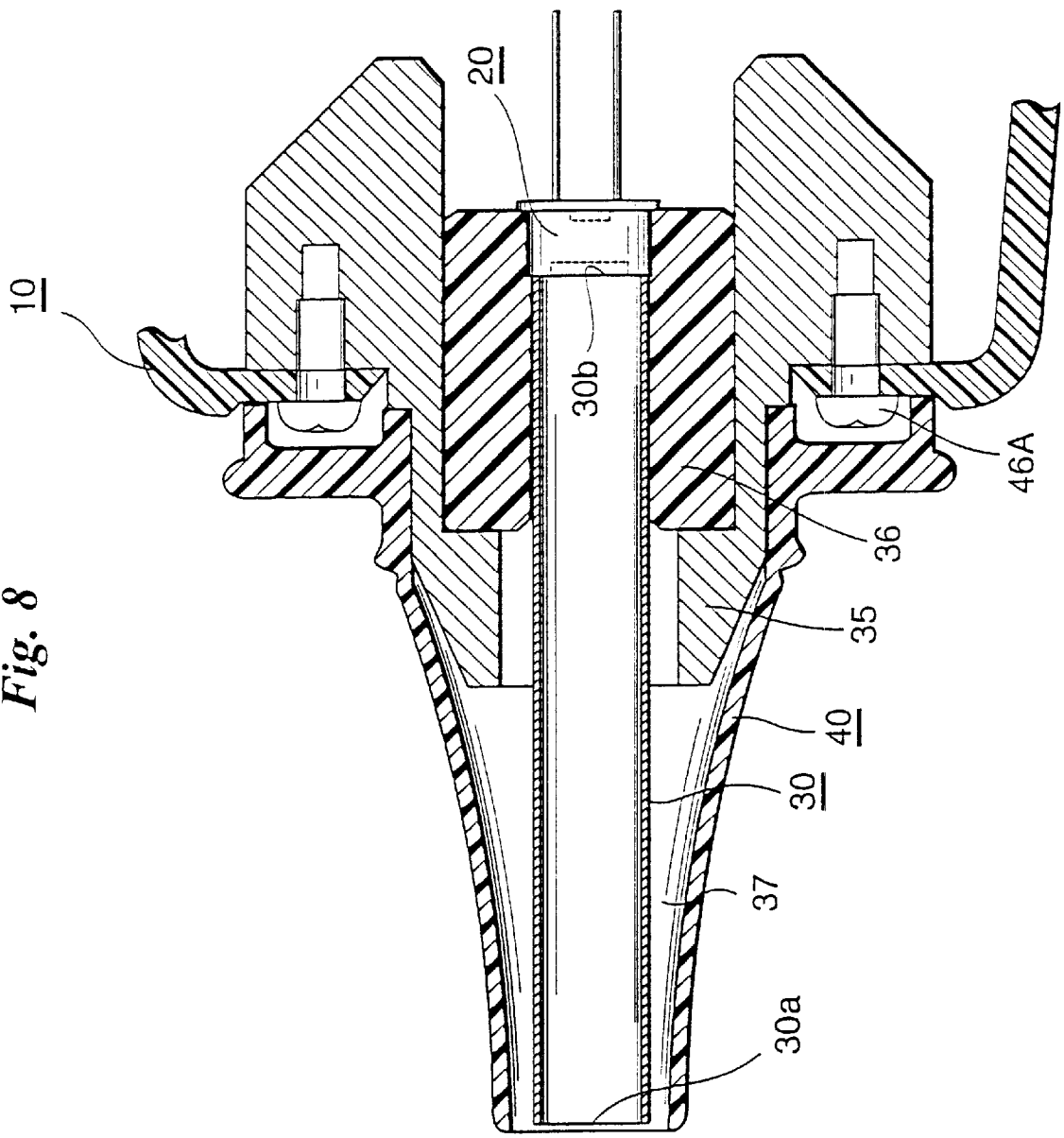

A comparison of FIG. 8 with the structure shown in FIG. 6 shows that the inner end 30b of the waveguide 30 is in contact with the infrared sensor 20. Since the end face of the inner end 30b of waveguide 30 has a small surface area, the conduction of heat is not large regardless of the aforesaid contact. This mode also falls within the concept of thermally insulating the infrared sensor 20 from the waveguide 30.

Figure 9:
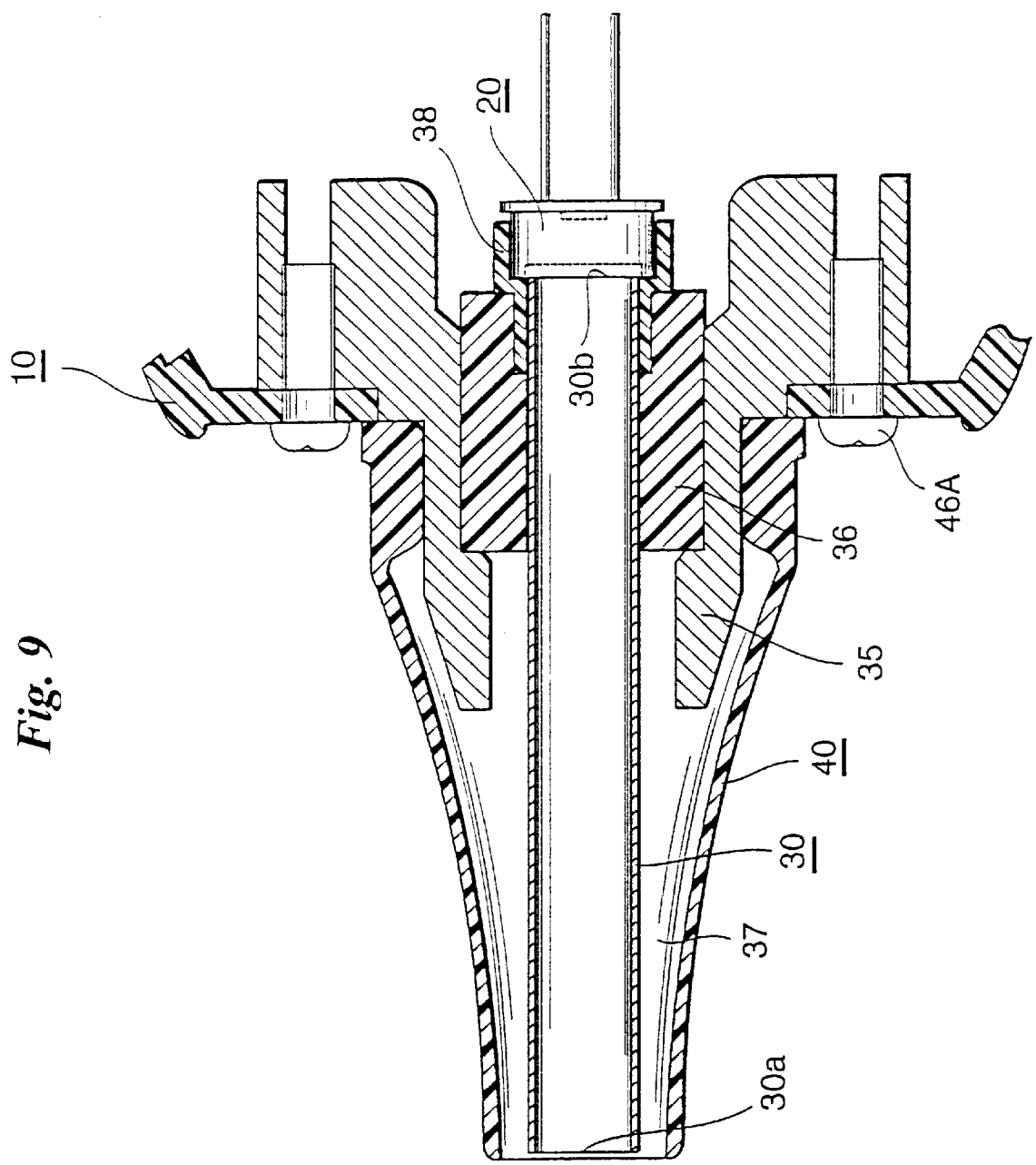

A comparison of FIG. 9 with the structure shown in FIG. 7 shows that the inner end 30b of the waveguide 30 is in contact with the infrared sensor 20. This mode also falls within the concept of thermally insulating the infrared sensor 20 from the waveguide 30.

Figure 10A:
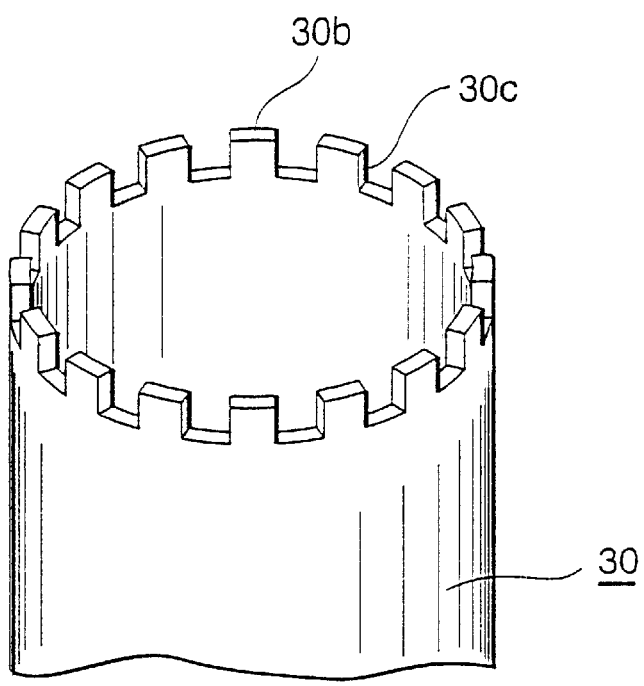
FIGS. 10a and 10b are perspective views illustrating modifications of the inner end of the waveguide.
Figure 10B:
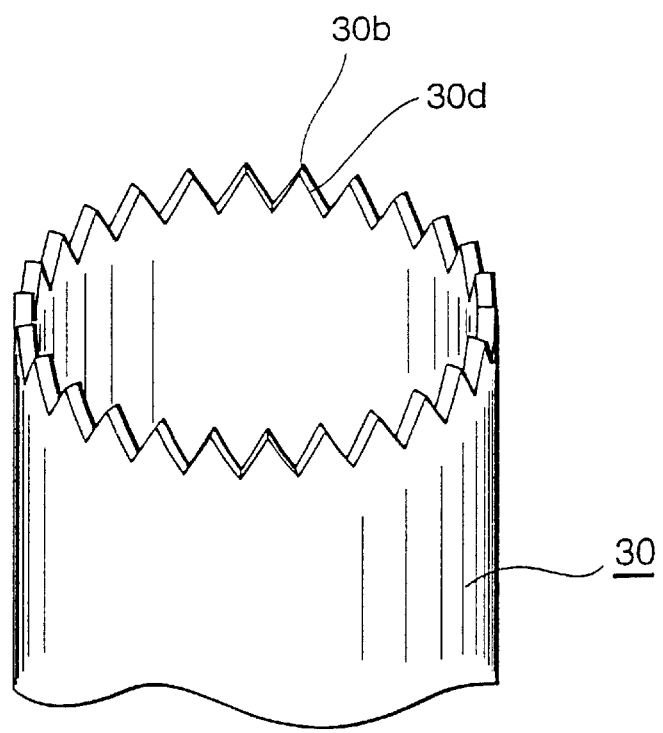

FIGS. 10a and 10b show modifications in which the inner end 30b is formed to have rectangular notches 30c or triangular notches 30d in order to reduce, to the maximum degree possible, the area of contact between the inner end 30b of waveguide 30 and the infrared sensor 20 (i.e., in order to enhance the insulative effect to the maximum degree possible even though the waveguide 30 is in contact with the infrared sensor 20). The notches may be of any shape, such as semicircular.

Figure 11:
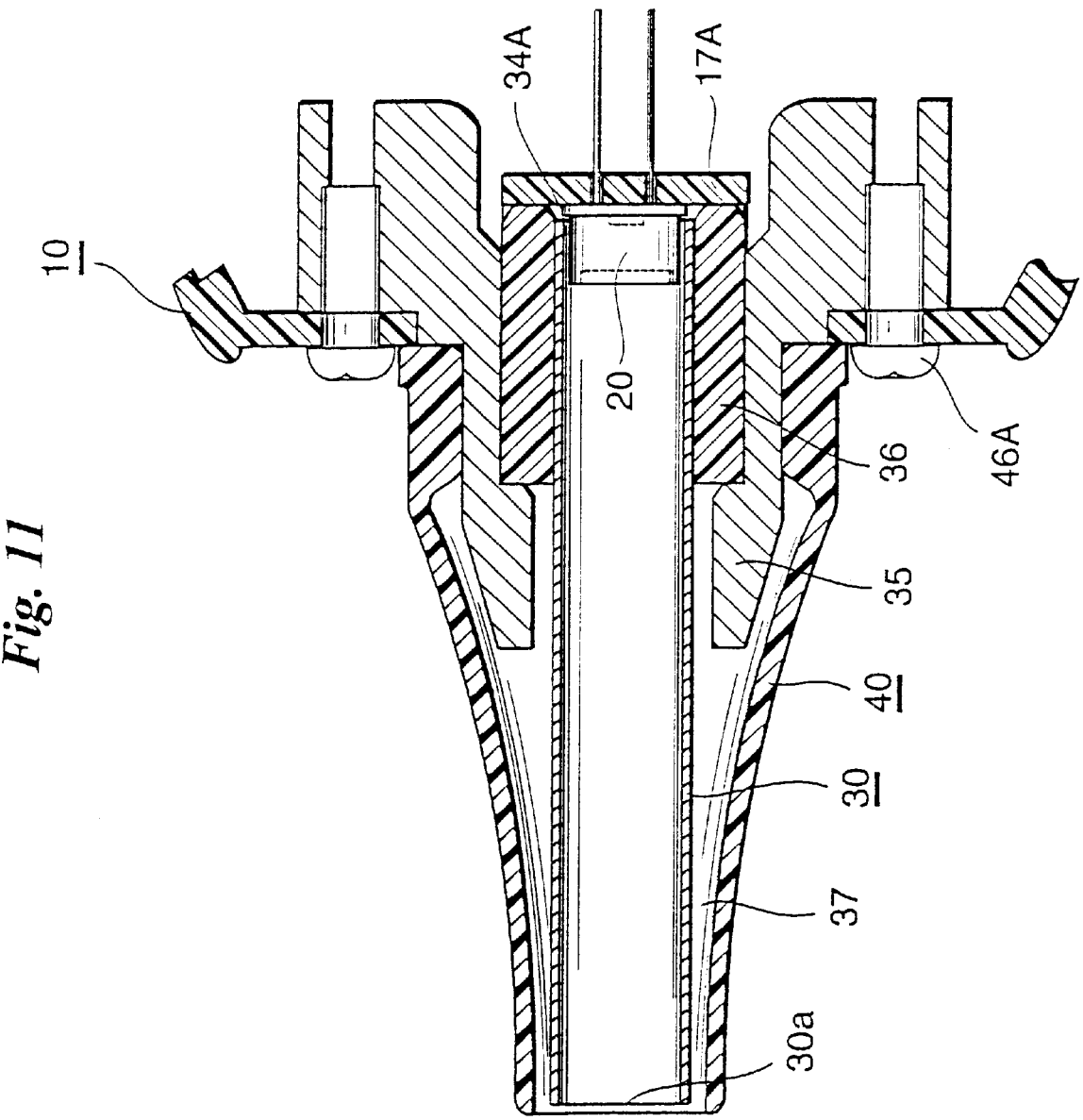
FIGS. 11 to 13, which illustrate other modifications, are partially enlarged sectional views of the infrared clinical thermometer.

In the infrared clinical thermometer shown in FIG. 11, the infrared sensor 20 is placed inside the inner end 30b of waveguide 30, which is supported in the holder 36, in spaced relation with respect to the inner surface of the waveguide 30 (owing to provision of a gap or air layer 34A). The infrared sensor 20 is attached to a board 17A secured to the holder 36.

Figure 12:
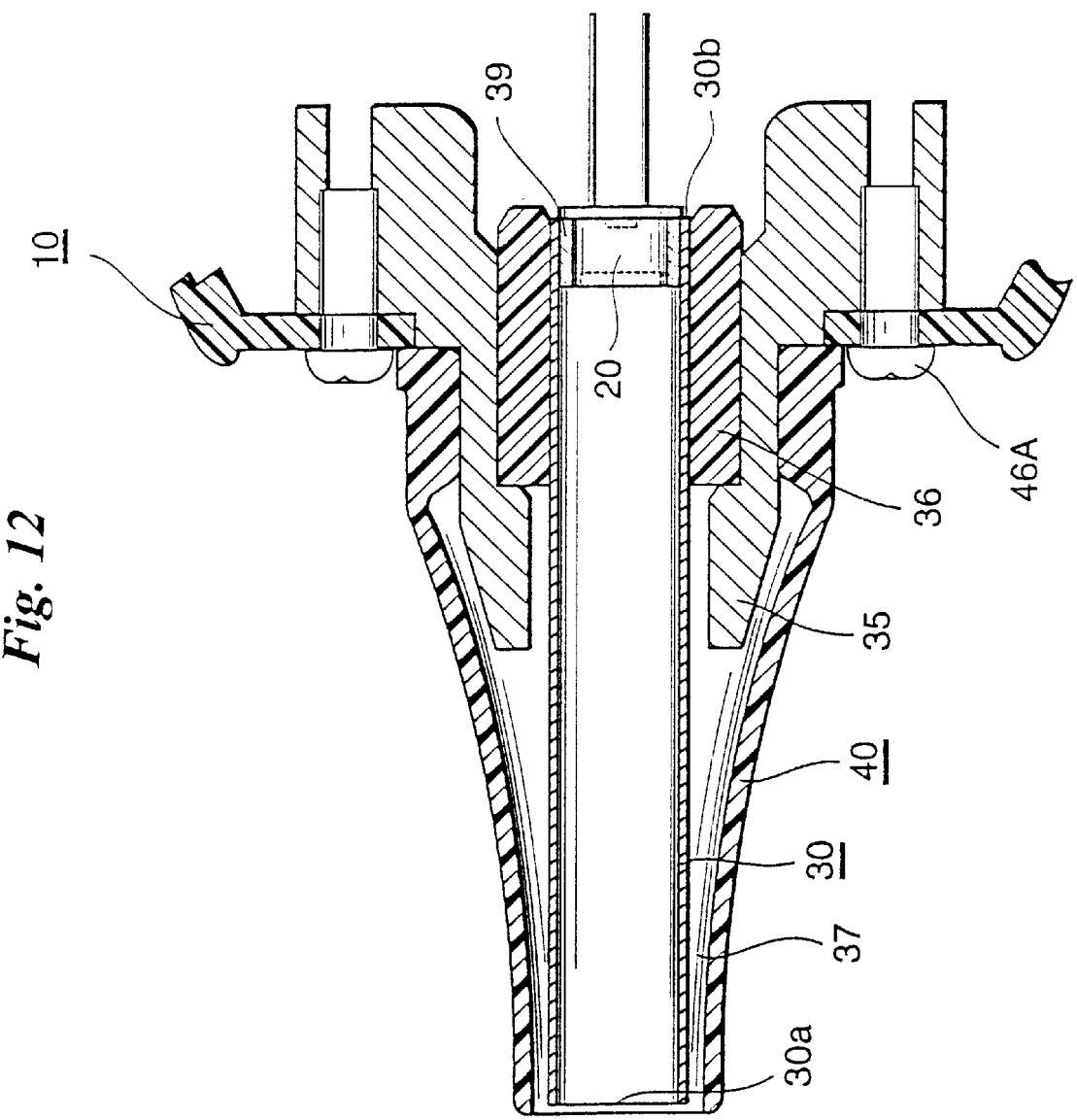

In FIG. 12, the infrared sensor 20 is supported inside the waveguide 30 via a heat insulator 39 such as cellular plastic, expanded plastic or foamed plastic (e.g., Styrofoam). The infrared sensor 20 is thermally insulated from the waveguide 30 in this mode as well.

Figure 13:
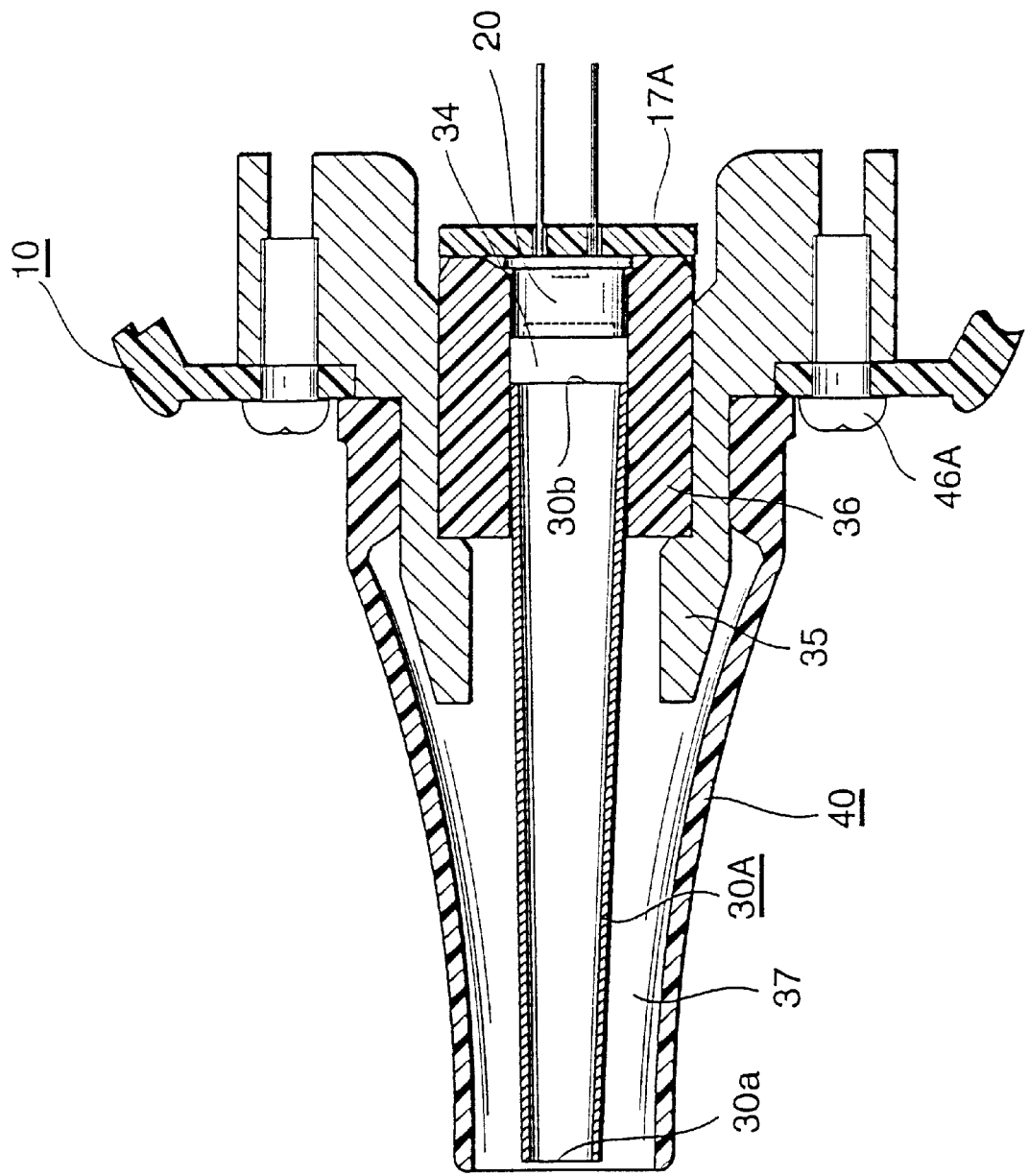

FIG. 13 illustrates a tapered waveguide 30A, which becomes successively more slender in the direction of the outer end 30A, in the arrangement of FIG. 11. The insulative air layer 34 resides between the inner end 30b of the waveguide 30A and the infrared sensor 20.

FIGS. 14 to 17c illustrate modifications of the waveguide cap.

Figure 14:
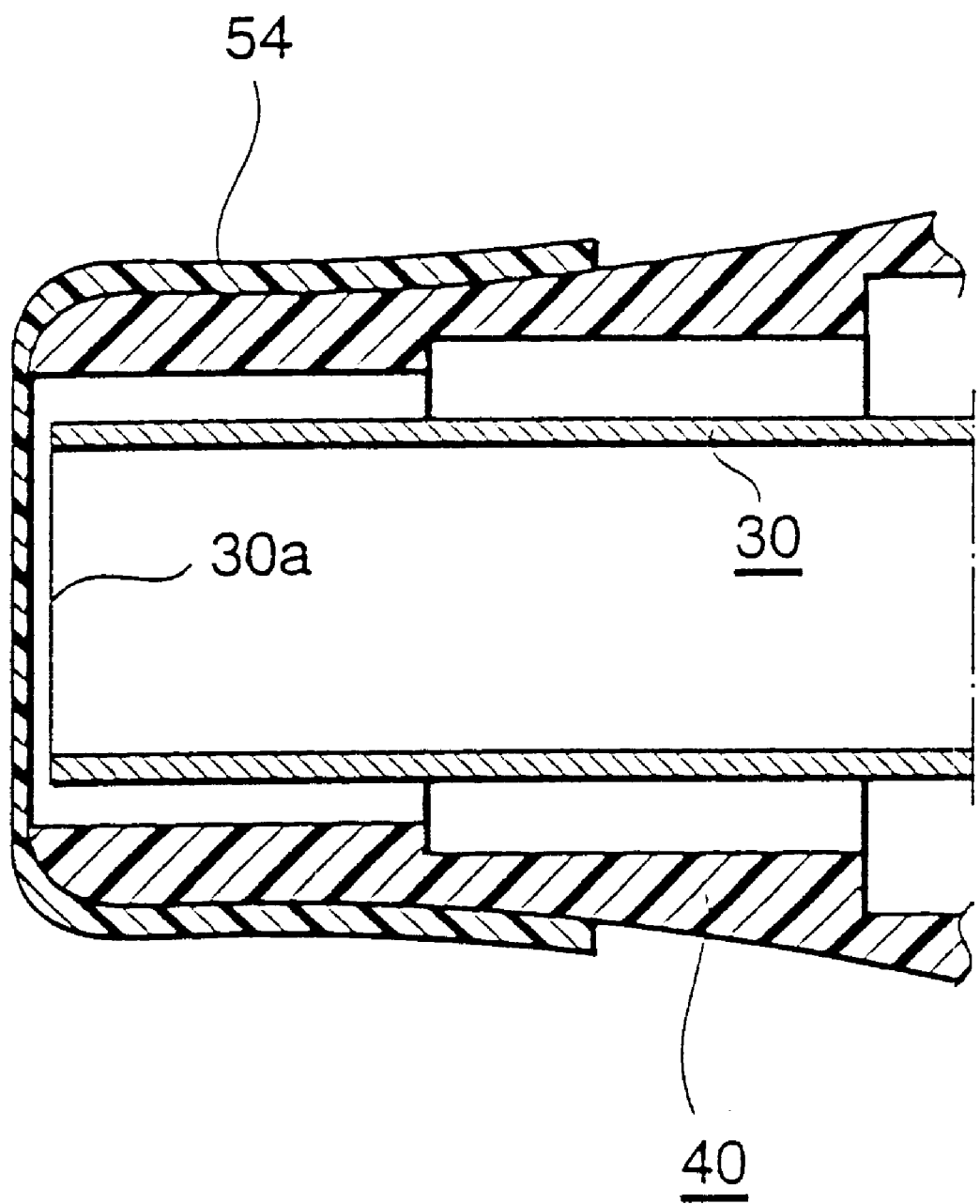
FIG. 14 is a sectional view illustrating a probe cap.

FIG. 14 illustrates a mode in which a cap (probe cab) 54 has been placed on the tip of the probe 40 and not on the waveguide 30. The cap 54 also is obtained by integrally forming an infrared-transparent upper bottom and a circumferential wall, which extend from the upper bottom, from a synthetic resin.

Figure 15:
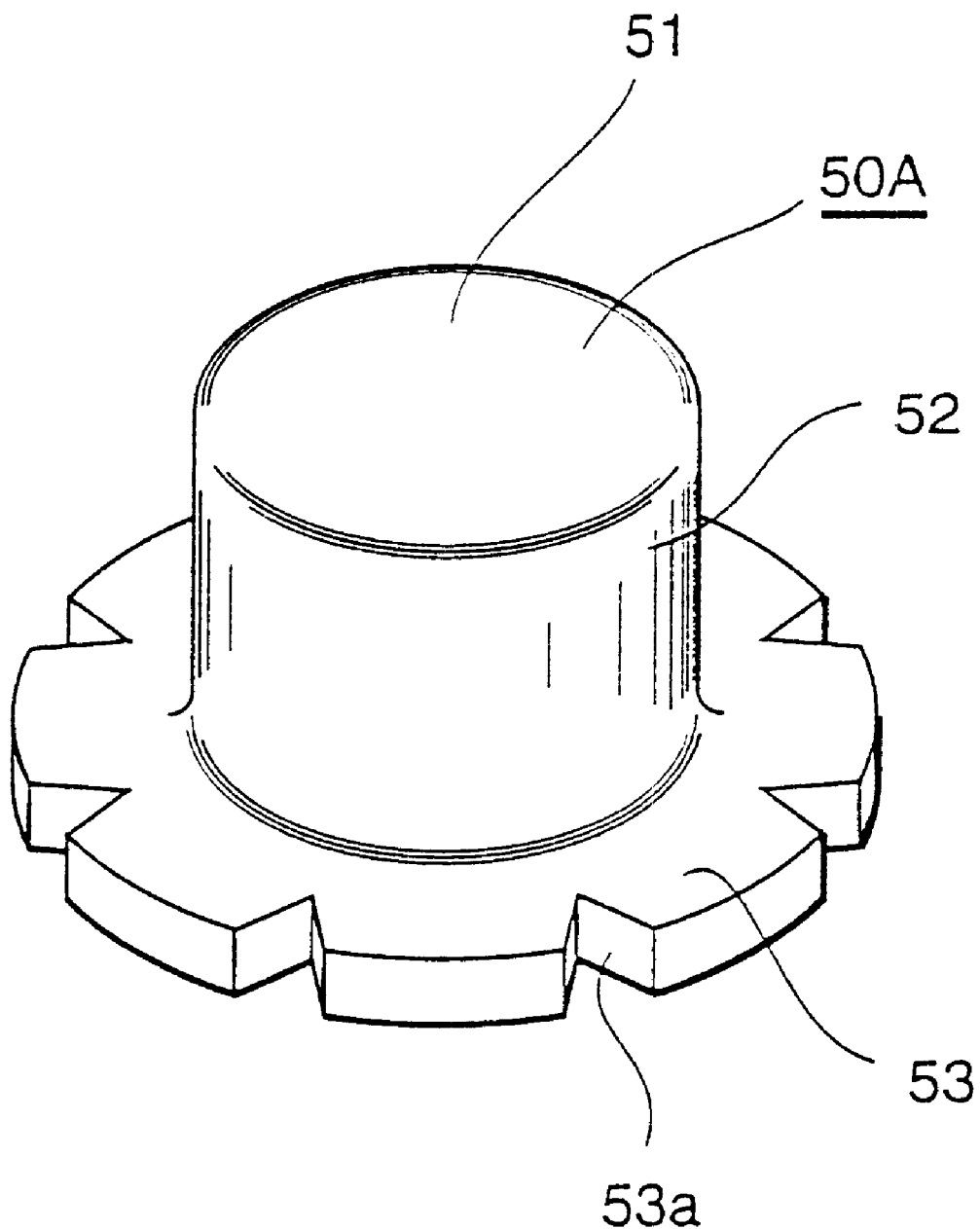
FIGS. 15, 16 and FIGS. 17a to 17c are perspective views each illustrating a modification of the waveguide cap.

A waveguide cap 50A shown in FIG. 15 is obtained by forming notches 53a in a flange 53. Here the area of the flange 53 that contacts the inner surface of the probe 40 is reduced to diminish the amount of heat transmitted from the probe 40 to the waveguide 30 via the flange 53 (i.e., to lessen the conduction of heat).

Figure 16:
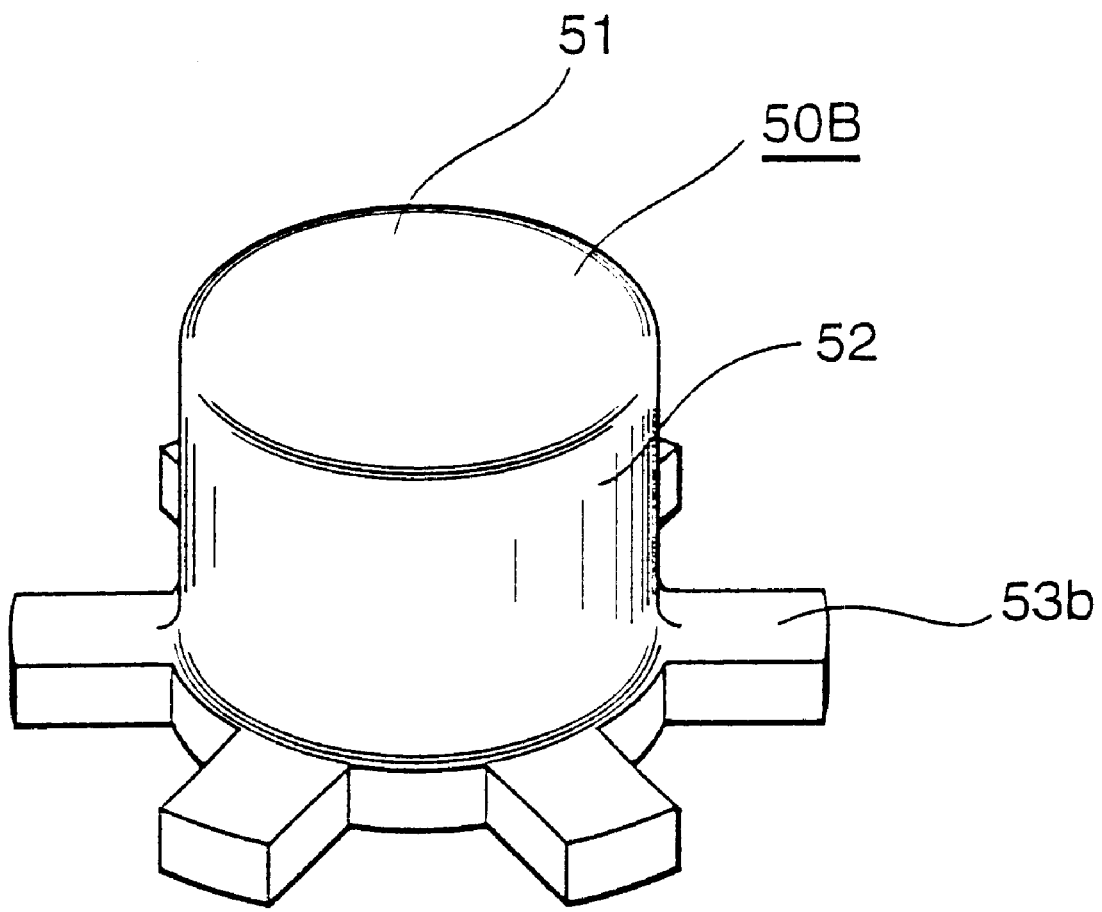

In FIG. 16, the cap 50B instead of the flange 53 is provided with several radiating projections 53b spaced apart from one another.

Figure 17A:
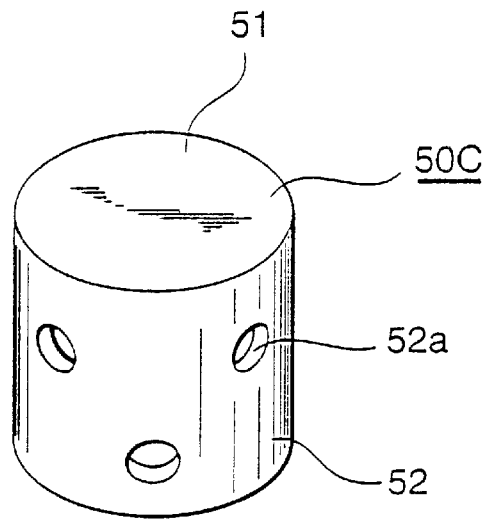
Figure 17B:
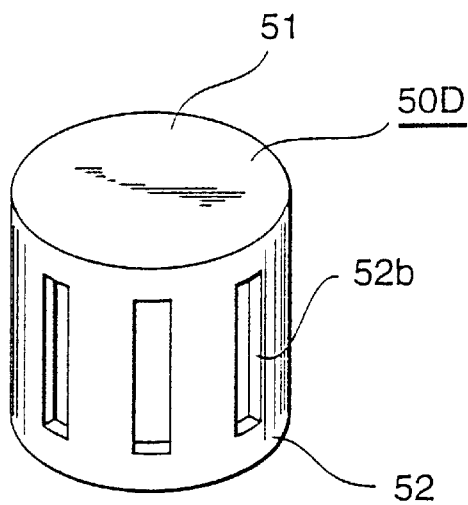
Figure 17C:
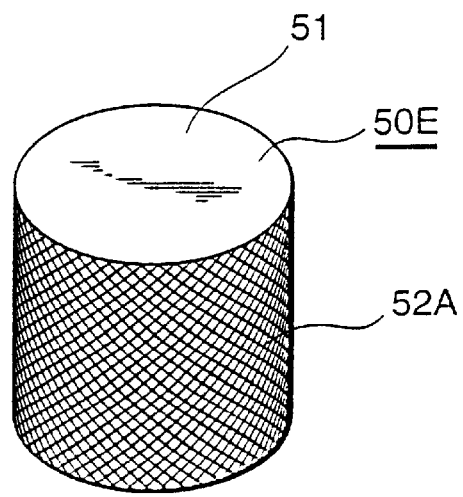

A cap 50C shown in FIG. 17a has a number of circular holes 52a formed in the circumferential wall portion 52. In FIG. 17b, the circumferential wall portion 52 is formed to have a number of slits 52b. FIG. 17c illustrates a cap 50E having a mesh-like circumferential wall portion 52A. Thus, by providing the circumferential wall portion of the cap with holes or slits or by using a mesh to form the circumferential wall portion, the area of contact with air is increased to enhance the heat radiating effect.

Figure 18:
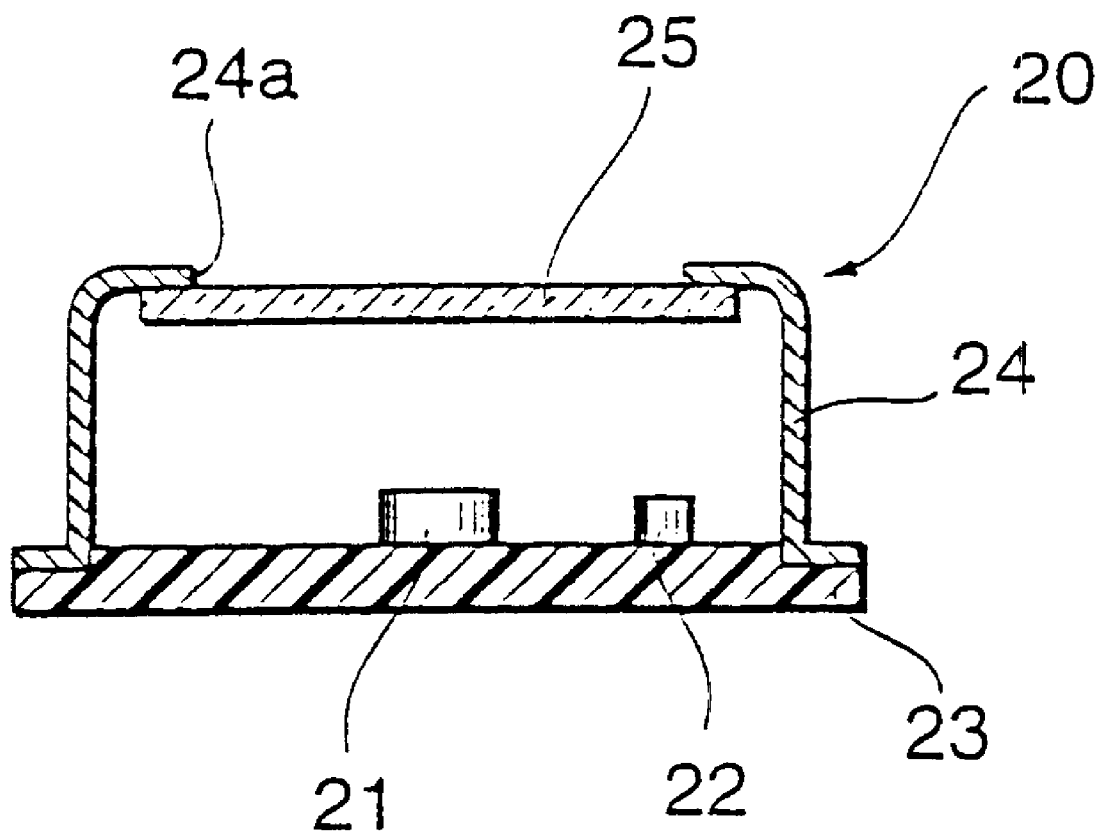
Figure 19:
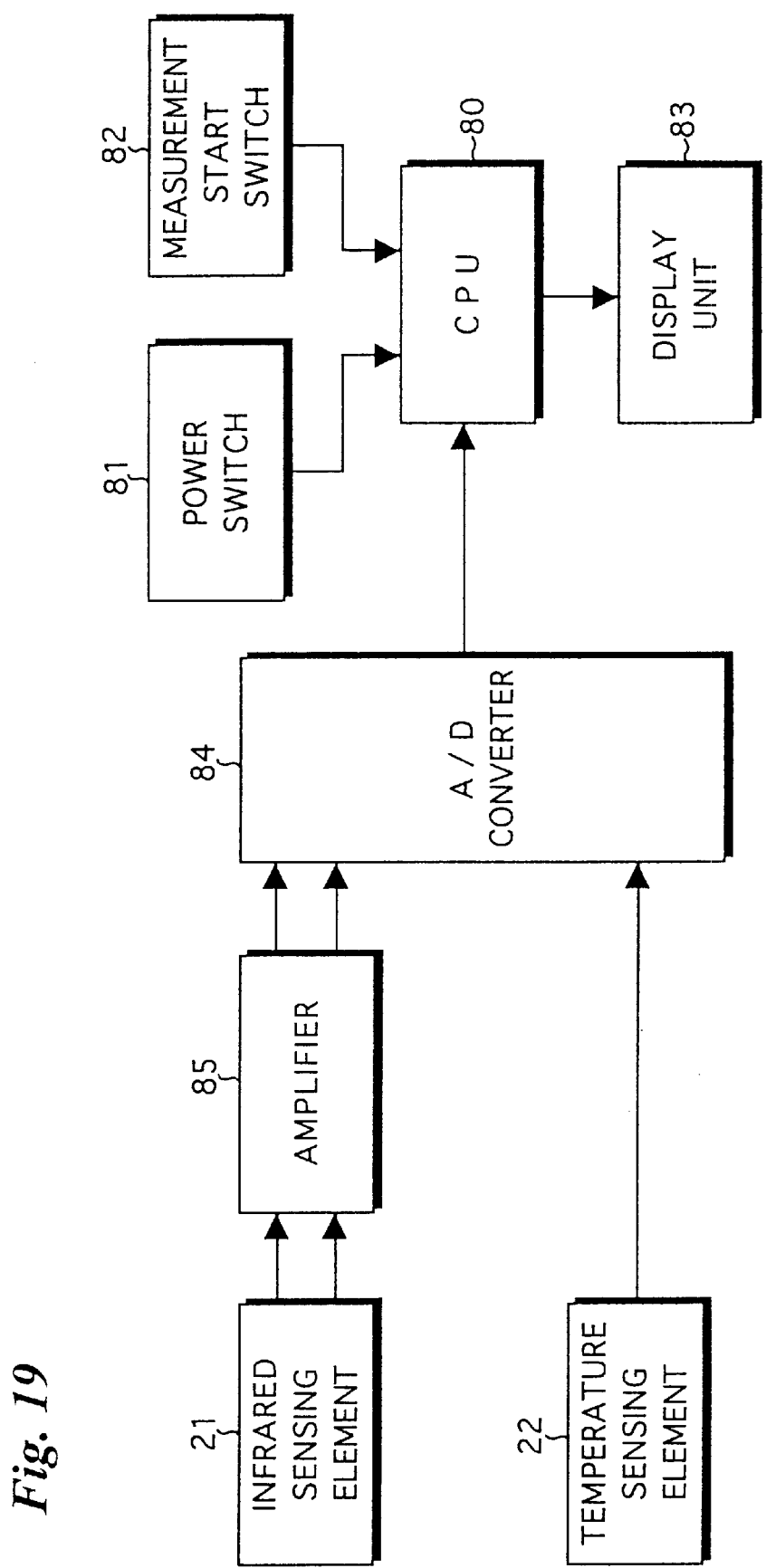
Figure 20:
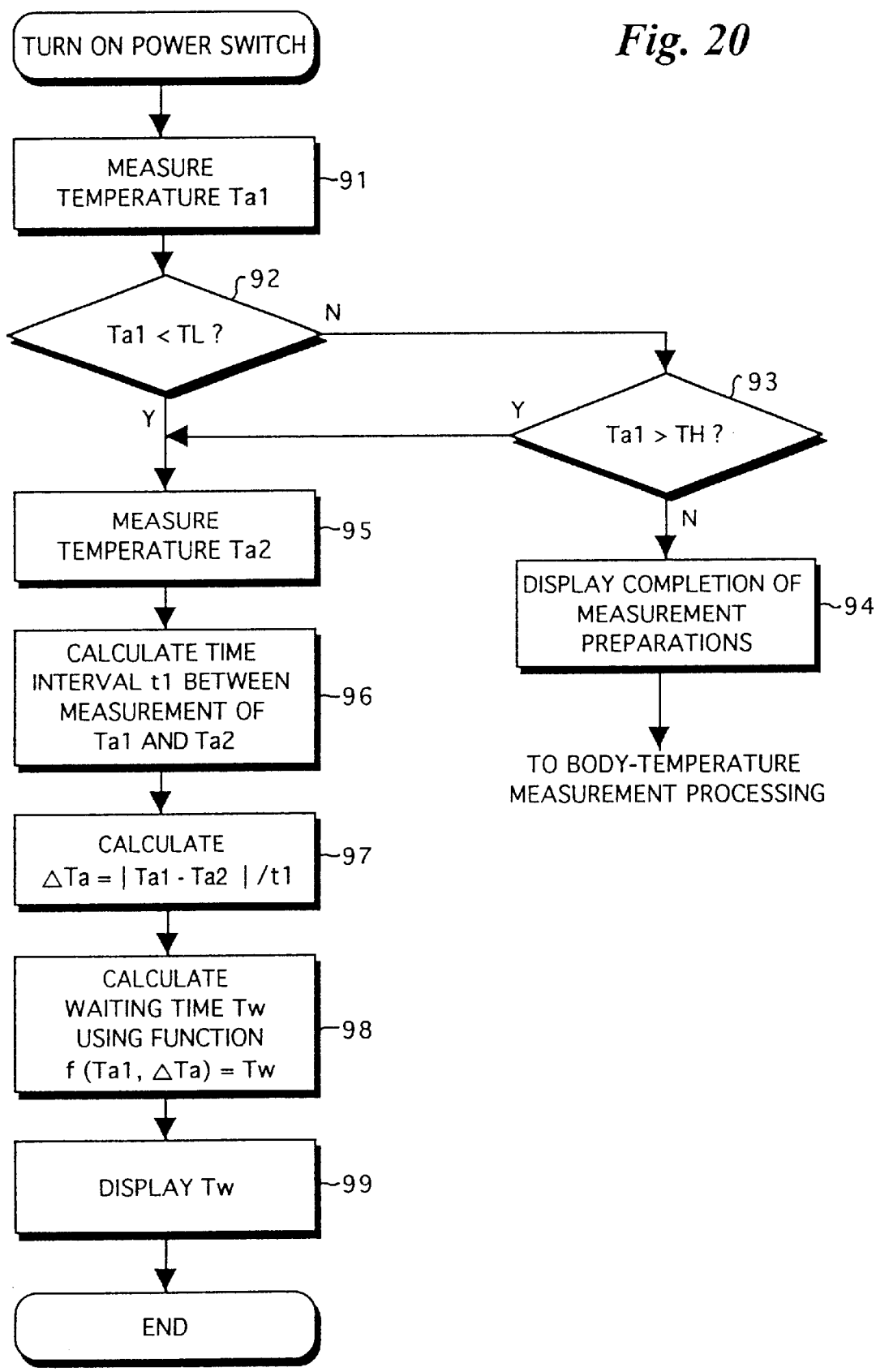

FIGS. 18 to 20 illustrate an embodiment relating to an infrared clinical thermometer that is capable of clearly indicating how much time must pass before a state in which measurement can actually be performed is attained when the infrared clinical thermometer, located in an environment where temperature is outside a temperature range for normal operation (a measurable temperature range), is moved to an environment where the temperature is within the measurable temperature range.

The structure of the infrared clinical thermometer may be any of those of the embodiments illustrated earlier or may be the structure according to the prior art.

The infrared clinical thermometer according to this embodiment is equipped with a temperature sensor. Though placing the temperature sensor in close proximity to the infrared sensor is adequate, the temperature sensing element may be provided within the infrared sensor, as depicted in FIG. 18.

In the infrared sensor 20 shown in FIG. 18, the infrared sensing element 21 is placed at the center of a circuit board 23, and a temperature sensing element 22 is placed close to the element 21. The elements 21, 22 are covered by a metal cap 24 mounted on the board 23. A window 24a on the front side of the cap 24 is provided with silicon glass 25.

FIG. 19 illustrates the electrical circuitry of the infrared clinical thermometer. Voltage outputs (a reference voltage and signal voltage), which correspond to detected infrared radiation, from the infrared sensing element (infrared sensor) 21 are amplified by an amplifier 85, and the amplified voltages are converted to digital signals by an A/D converter 84. The digital signals are applied to a CPU 80. Likewise, an output from the temperature sensing element (temperature sensor) also is converted to a digital signal by the A/D converter 84 and the digital signal is input to the CPU 80. When a power switch 81 is turned on and then a measurement start switch 82 is turned on, the CPU 80 executes body-temperature measurement processing based upon the output of the infrared sensing element 21, corrects the measured body temperature in accordance with the output of the temperature sensing element 22 as necessary and causes a display unit 83 to display the measured body temperature that has finally been decided. Further, when the power switch 81 is turned on, the CPU 80 executes processing, described later, based upon the output of the temperature sensing element 22 and causes the display unit 83 to display waiting time.

FIG. 20 illustrates the processing executed by the CPU 80, in which processing the CPU determines whether measurement of body temperature is possible or not when the power switch 81 has been turned on, and, if measurement is not possible, estimates and displays how much waiting time is necessary before body-temperature measurement becomes possible.

Let TH and TL represent upper- and lower-limit temperatures, respectively, of a temperature range (measurable temperature range) in which measurement of body temperature is possible (e.g., TH=40° C., TL=10° C.).

If the power switch 81 is turned on, the CPU reads in the output of the temperature sensing element 22 at this time and measures a temperature Ta1 (step 91). If the measured temperature Ta1 lies within the measurable temperature range (TL≦Ta1≦TH) ("NO" at steps 92 and 93), measurement of body temperature is possible. The CPU therefore causes the display unit 83 to display the fact that measurement is possible (step 94) and advances control to body-temperature measurement processing upon waiting for an input from the measurement start switch 82.

If the measured temperature Ta1 is outside the measurable temperature range ("YES" at step 92 or 93), then, upon elapse of a predetermined length of time, the CPU reads in the output of the temperature sensing element 22 again and measures a temperature Ta2 at this time (step 95).

If the temperature environment of the infrared clinical thermometer has changed (e.g., as when the infrared clinical thermometer is brought from a cold room in which the clinical thermometer is stored to a warm room in which body temperature is measured), then the temperature within the clinical thermometer, i.e., the output of the temperature sensing element 22, also changes accordingly. The CPU calculates this amount of change in temperature in accordance with ΔTa=|Ta1−Ta2|/t1 (steps 95, 96). Here time t1 is elapsed time from the time at which temperature Ta1 was measured to the time at which temperature Ta2 was measured. The time t1 may be a fixed length of time determined in advance, or the passage of time from the processing of step 91 to the processing of step 95 may be adopted.

If the present temperature (Ta1 or Ta2) and the amount of change ΔTa in temperature are known, then the CPU can estimate a time Tw necessary for temperature to fall within the measurable temperature range. Let the function for this estimation be expressed by f(Ta1,ΔTa).

The function f(Ta1,ΔTa) is expressed as a linear approximation, by way of example. That is, if we assume that the change in temperature is linearly related to passage of time, then the function f can be expressed is simplest form.

If time needed for the present temperature Ta1, which is below the lower-limit temperature TL, to rise and attain the lower-limit temperature TL is waiting time Tw, then Tw is given by the following equation:

$$Tw=f(Ta1,\Delta Ta)=k(TL-Ta1)\Delta Ta$$

where k represents a constant, for which a value of 1.0 or greater is generally used.

If time needed for the present temperature Ta1, which is above the upper-limit temperature TH, to fall to the upper-limit temperature TH is the waiting time Tw, then Tw is given by the following equation:

$$Tw=f(Ta1,\Delta Ta)=k(Ta1-TH)\Delta Ta$$

A temperature TM[=(TL+TH)/2] midway between these temperatures TL, TH may be used instead. of TL, TH in the above equations.

The waiting time Tw can be estimated utilizing the reference voltage output of the infrared sensing element instead of the output of the temperature sensing element.

When the waiting time Tw is calculated (step 98), the calculated time Tw is displayed on the display unit 83 (step 99).

Thus, the user can ascertain approximately how much time will be required before the infrared clinical thermometer can be used.

What is claimed is:

1. An infrared thermometer comprising:

infrared measurement means for measuring temperature of a target based upon an output of an infrared sensor;

temperature measurement means for measuring temperature within the infrared thermometer;

means for determining whether the temperature measured by said temperature measurement means lies within a measurable temperature range of said infrared measurement means;

means for estimating waiting time that would be needed for the temperature measured by said temperature measurement means to fall within the measurable temperature range when said determination means has determined that the measured temperature does not lie within the measurable temperature range; and means for giving notification of the waiting time that has been estimated by said estimation means.

2. An infrared thermometer according to claim 1, wherein said estimation means estimates waiting time based upon temperatures measured by said temperature measurement means at least at two different times, and length of time between said two times.

* * * * *